G. HOEPNER.
AUTOMATIC WEIGHING MACHINE.
APPLICATION FILED JAN. 26, 1920.
1,402,934.
Patented Jan. 10, 1922.
15 SHEETS—SHEET 4.
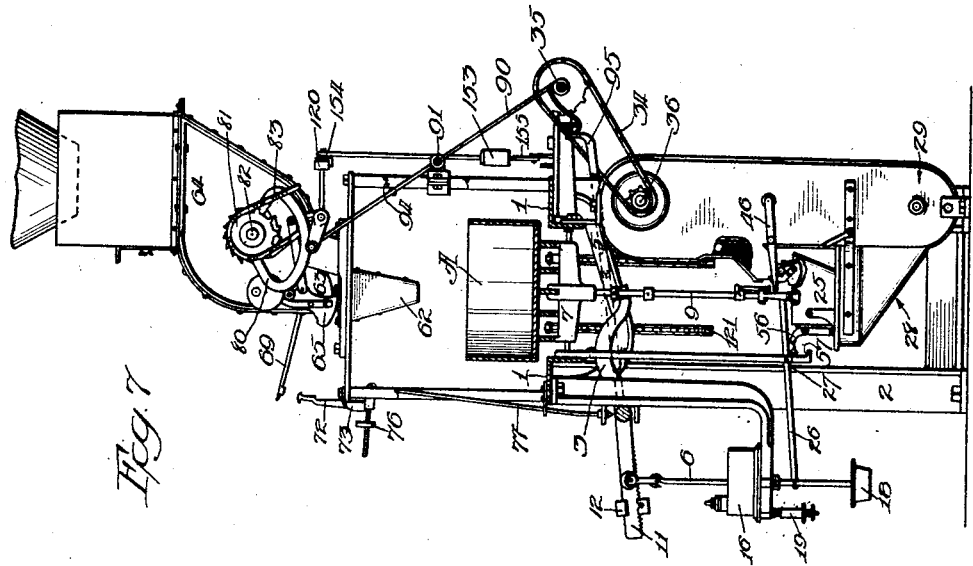
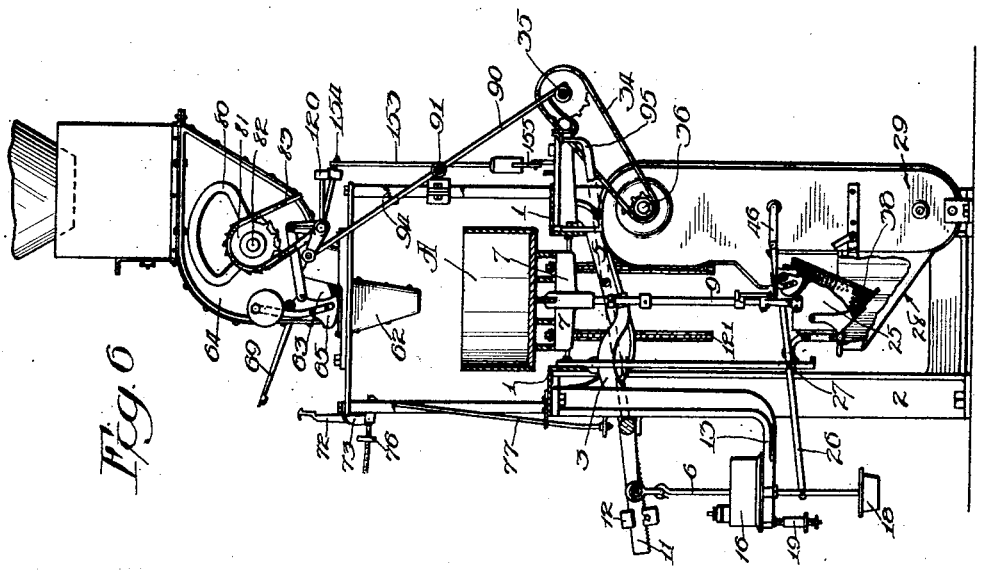
Inventor:
George Hoepner G. HOEPNER.
AUTOMATIC WEIGHING MACHINE.
APPLICATION FILED JAN. 26, 1920.
1,402,934.
Patented Jan. 10, 1922.
15 SHEETS—SHEET 5.
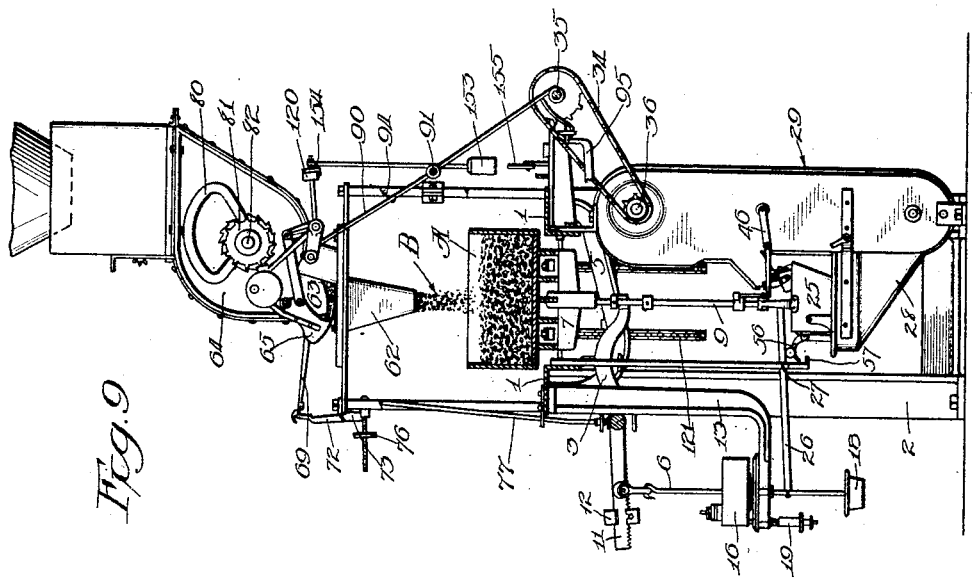
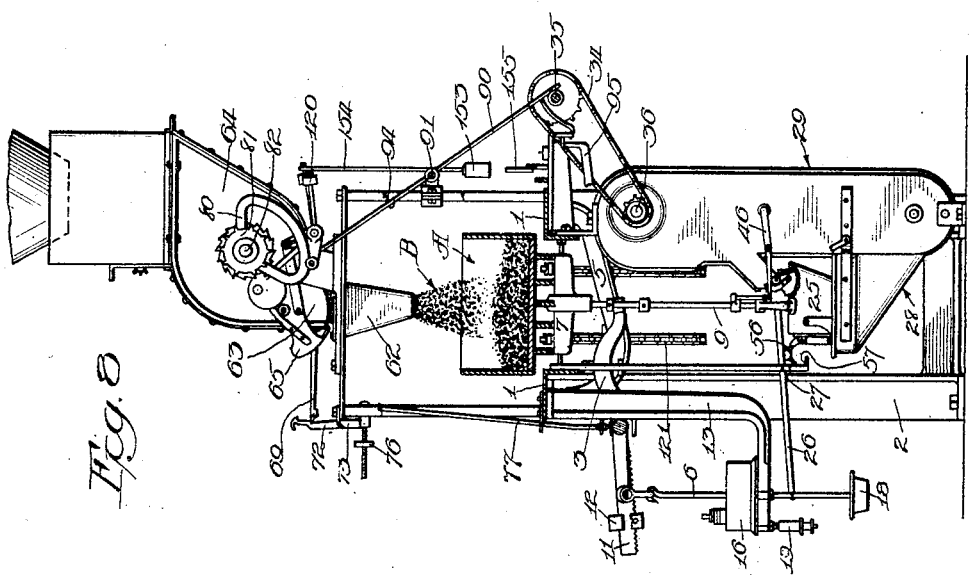
Witness:
Isaac Gilooly
Inventor:
George Hoepner
By Chamberlin Brendenreich
Attys G. HOEPNER.
AUTOMATIC WEIGHING MACHINE.
APPLICATION FILED JAN. 26, 1920.
1,402,934.
Patented Jan. 10, 1922.
15 SHEETS—SHEET 6.
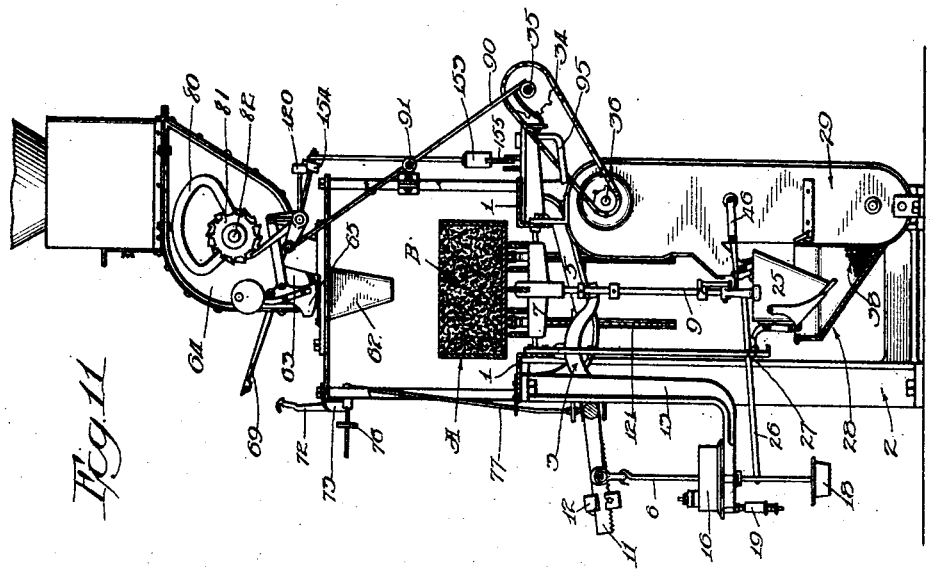
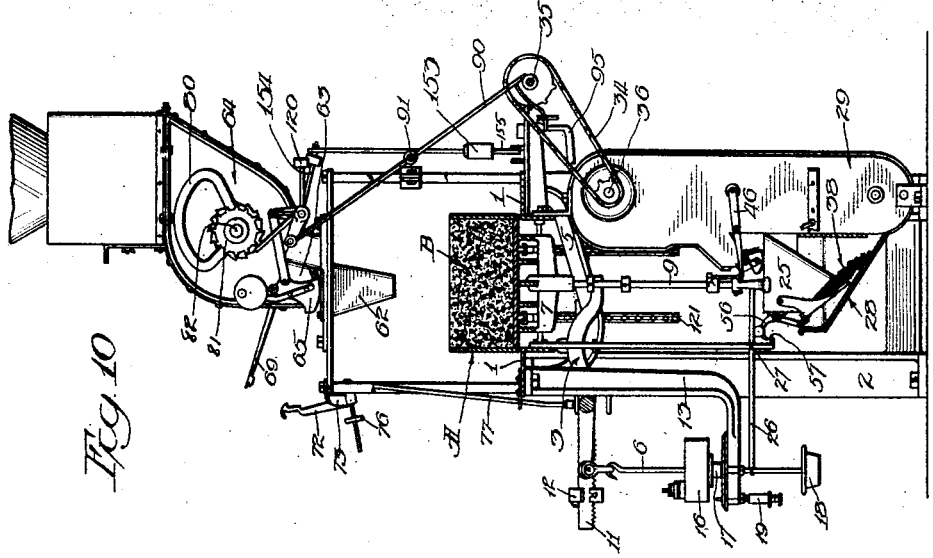
Witness:
Isaac Gilooly
Inventor:
George Hoepner
By Chamberlin & Brendenreich
Attys

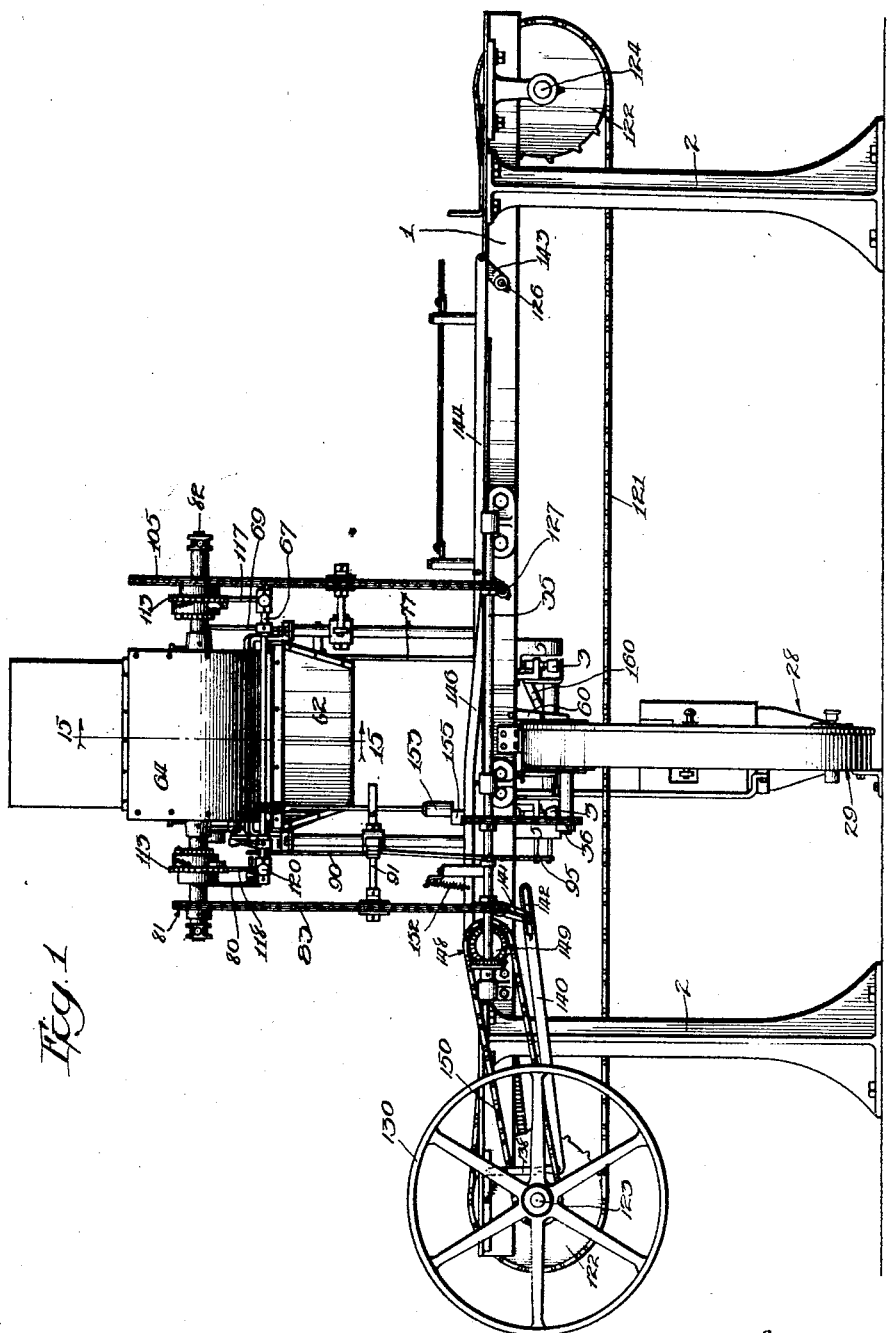

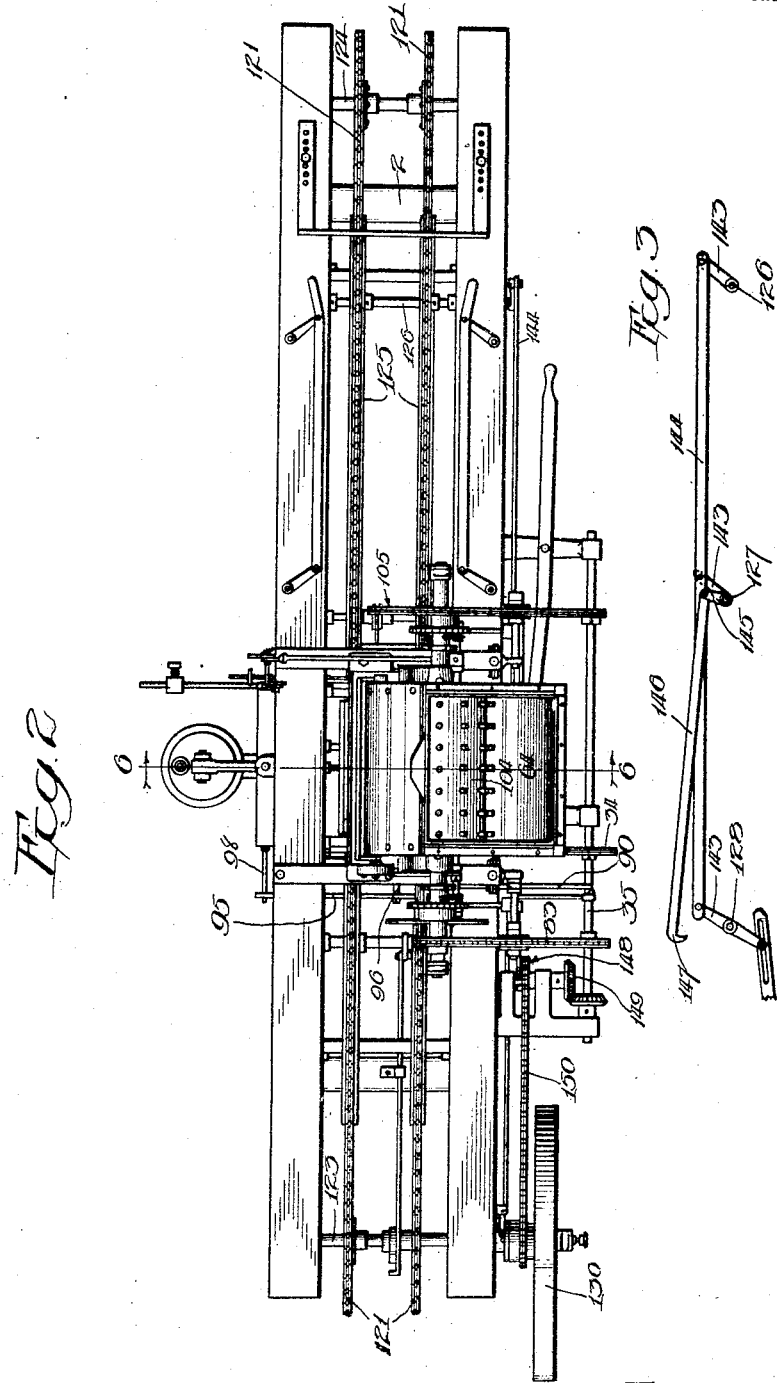

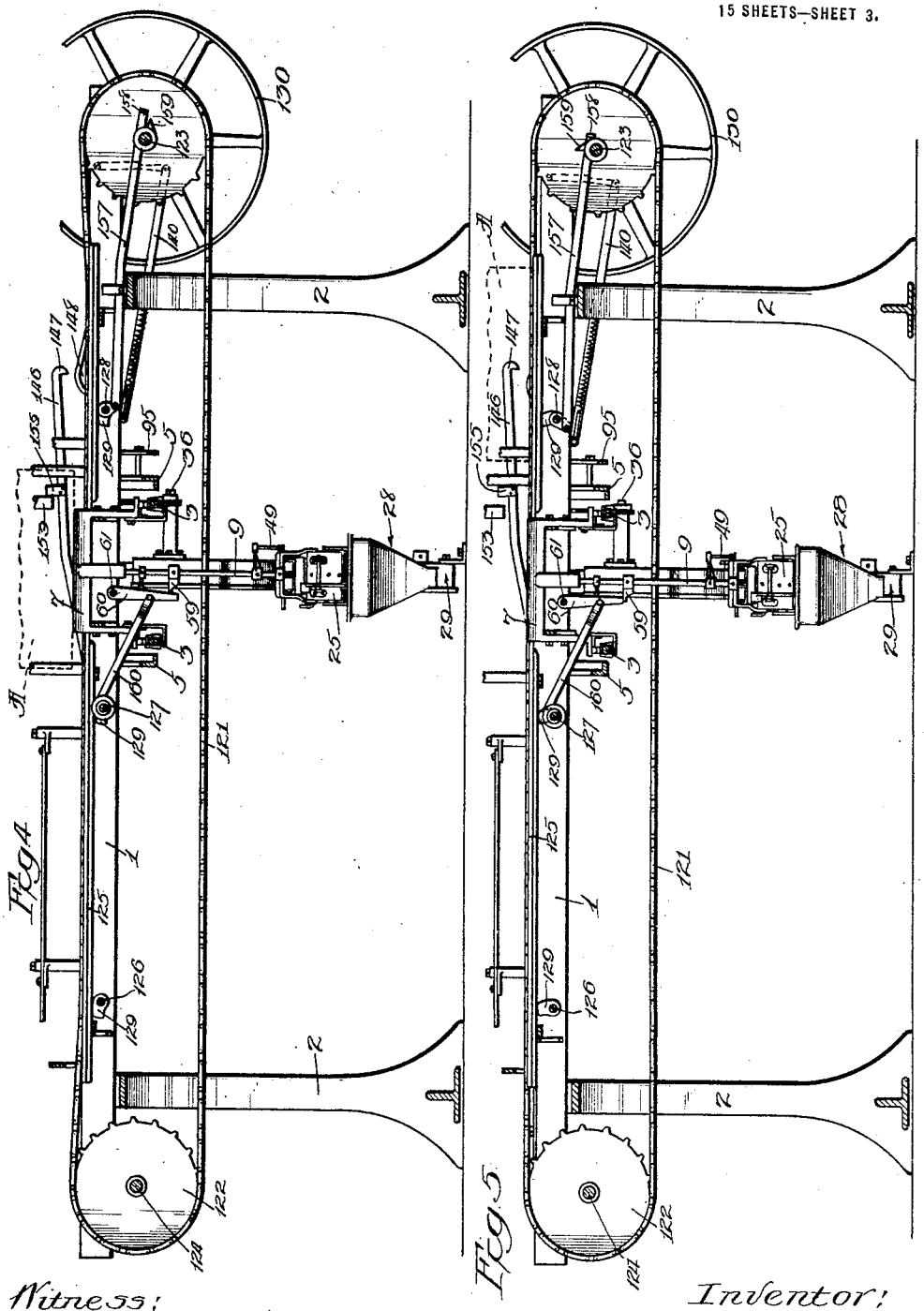

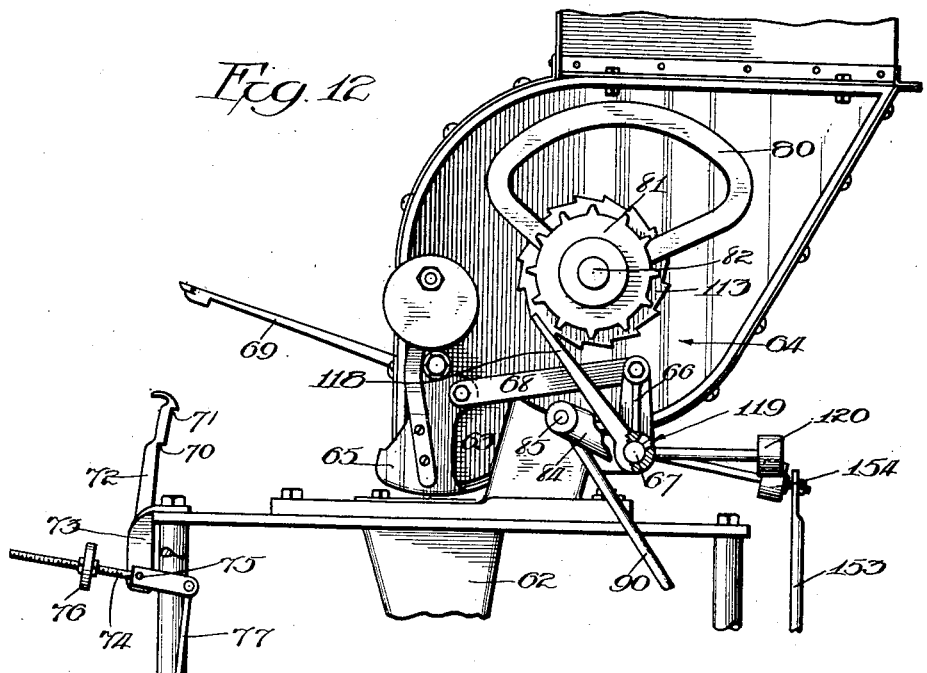
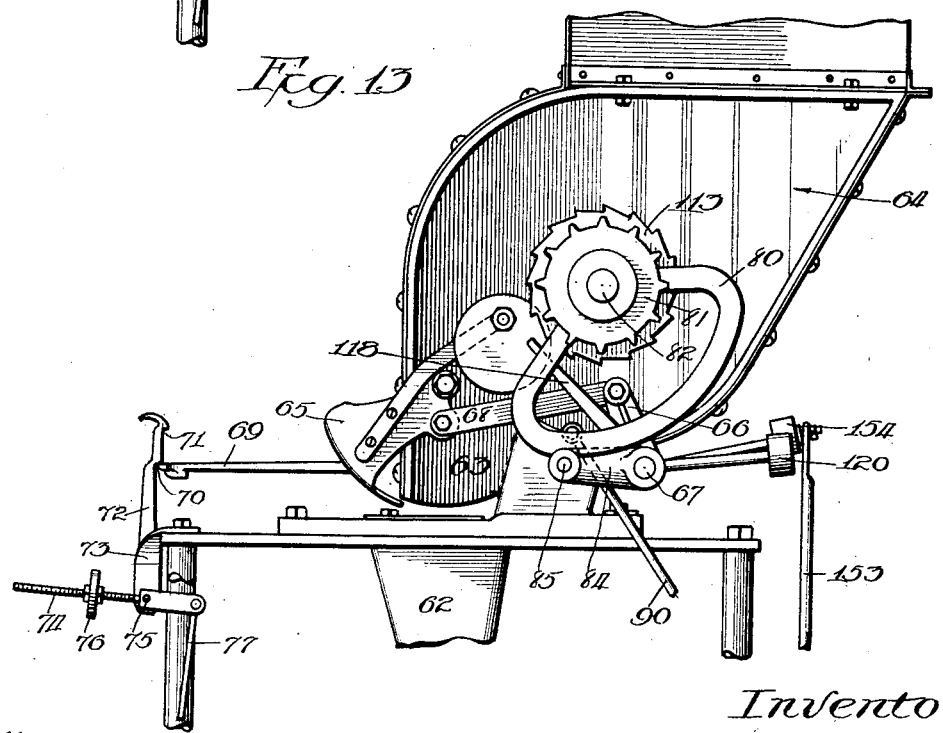

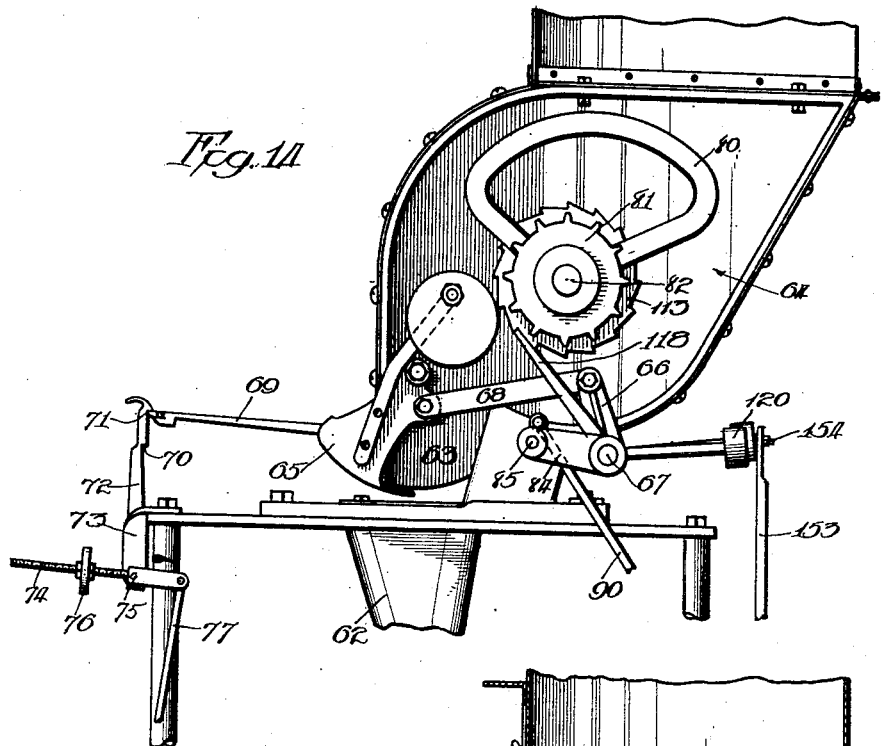

G. HOEPNER.
AUTOMATIC WEIGHING MACHINE.
APPLICATION FILED JAN. 26, 1920.
1,402,934.
Patented Jan. 10, 1922.
15 SHEETS—SHEET 9.
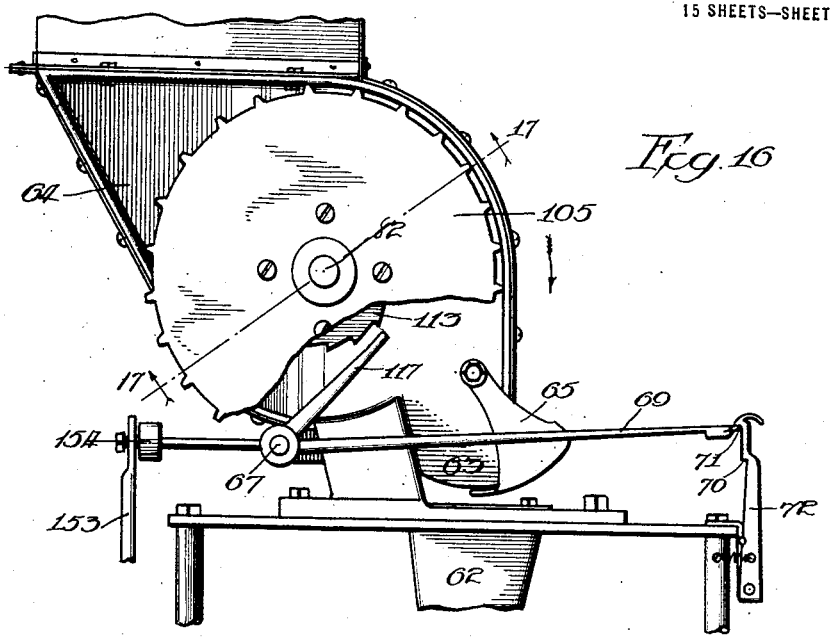
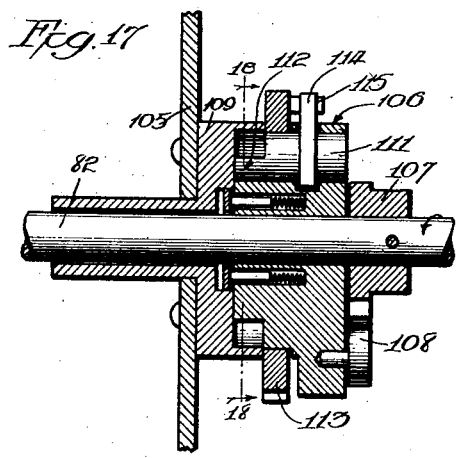
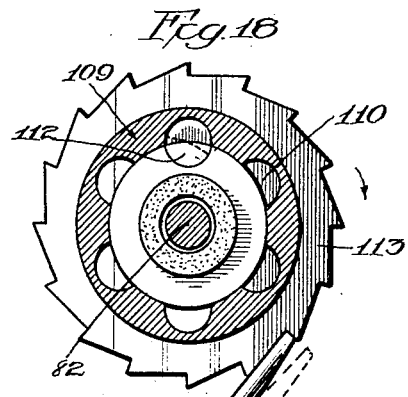
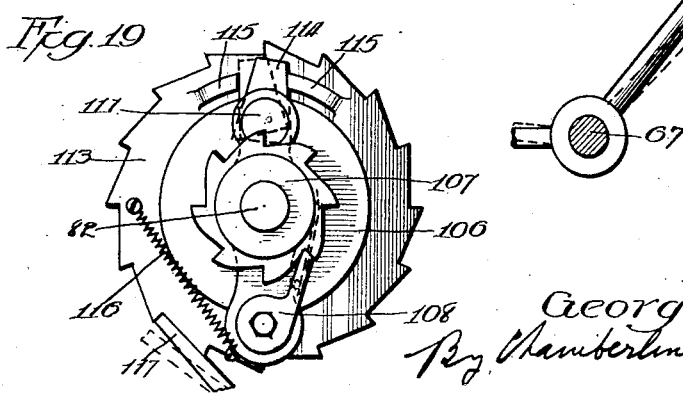
Inventor:
George Hoepner
By Chamberlin & Brendemiehl
Atty's

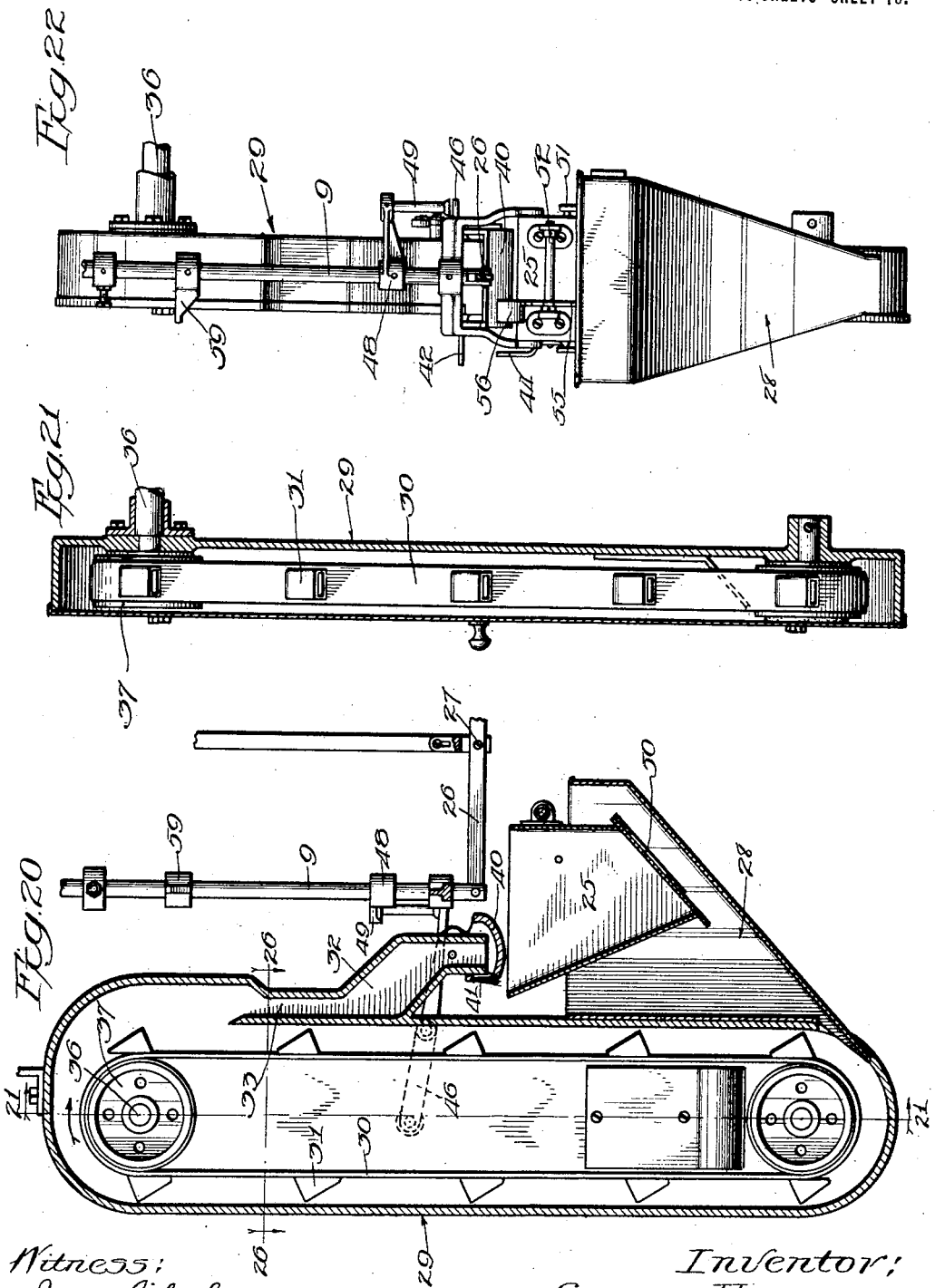

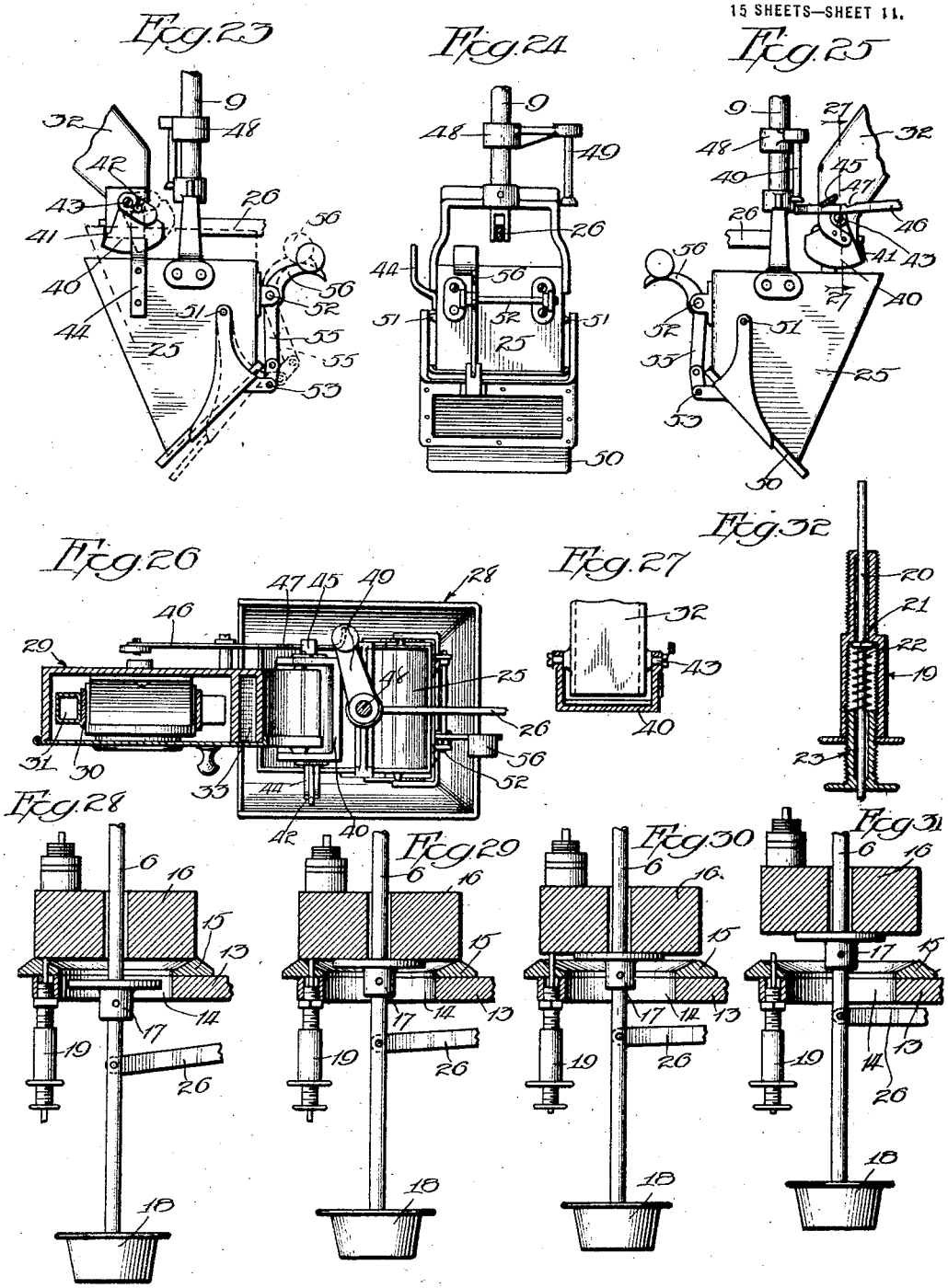

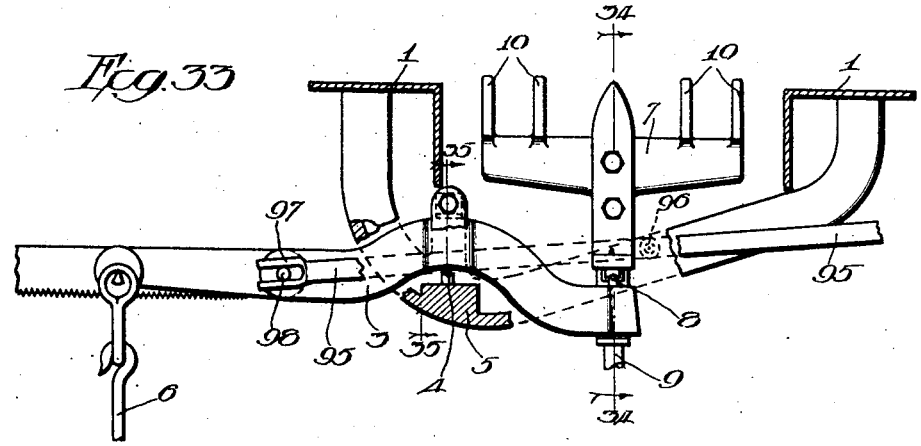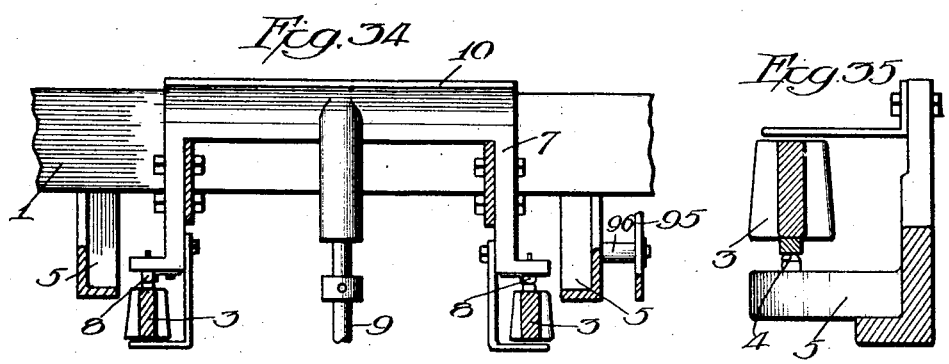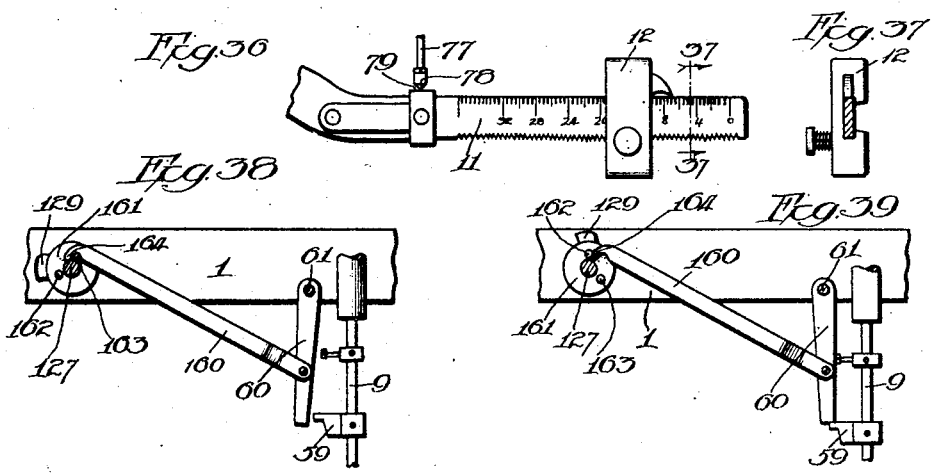

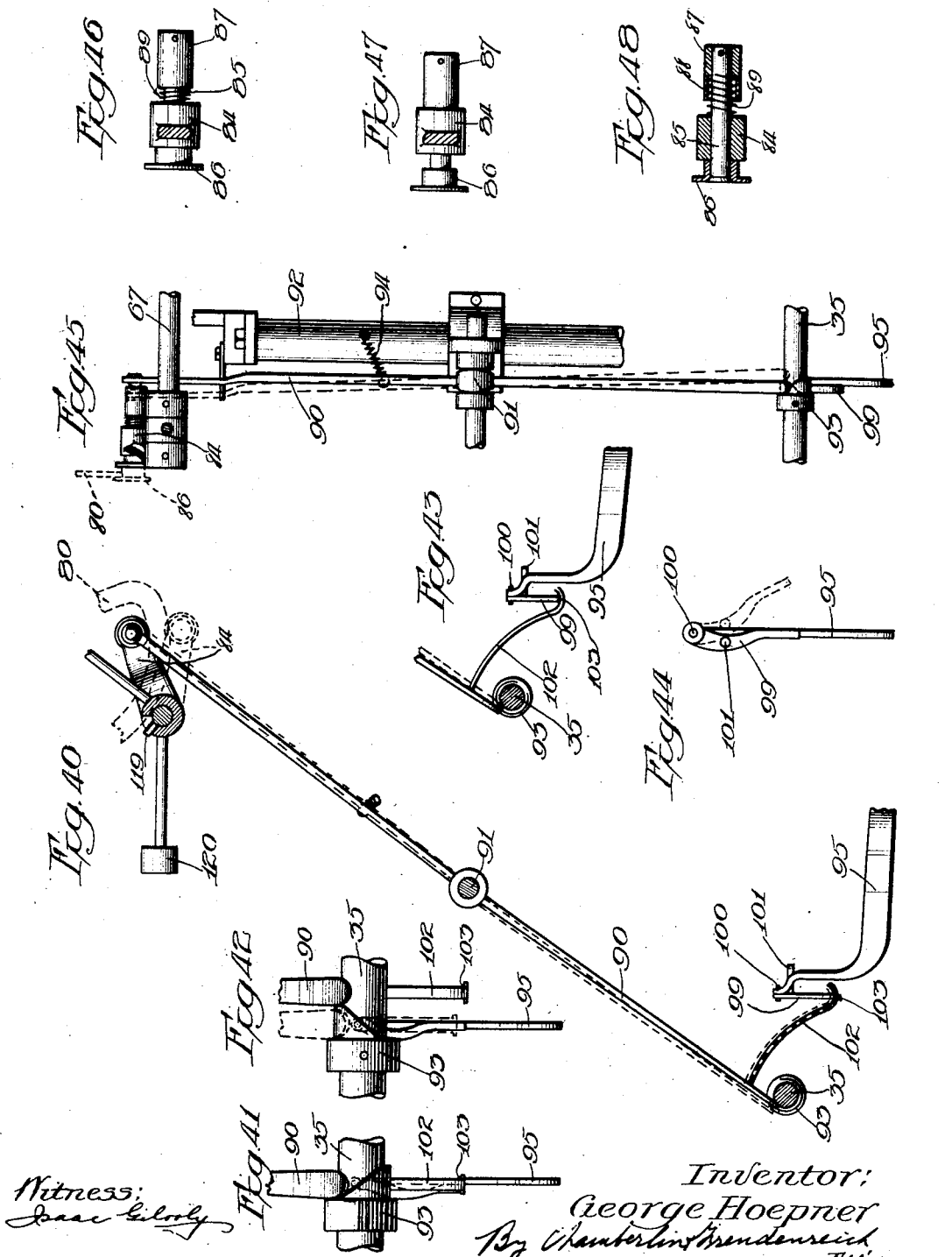

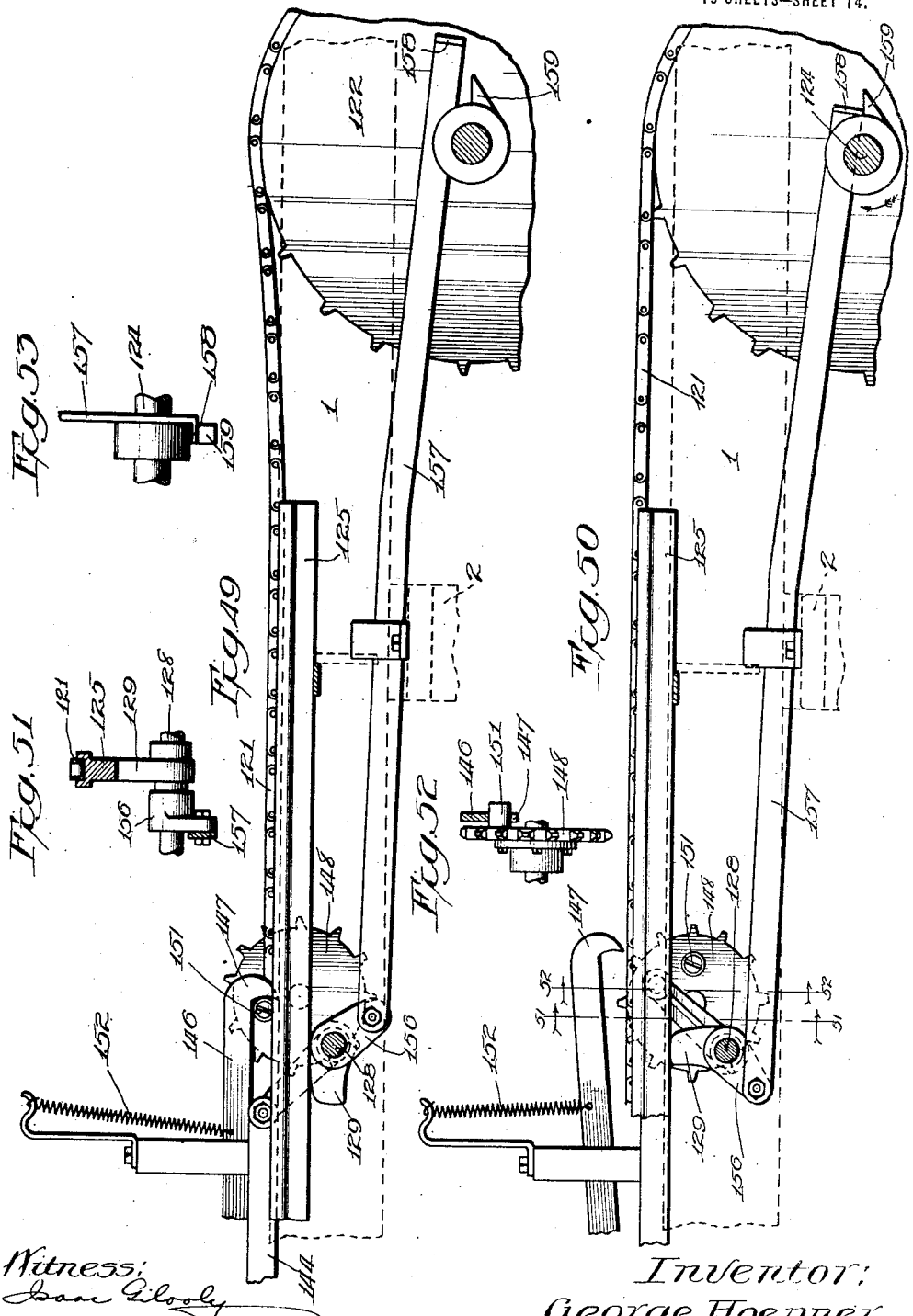

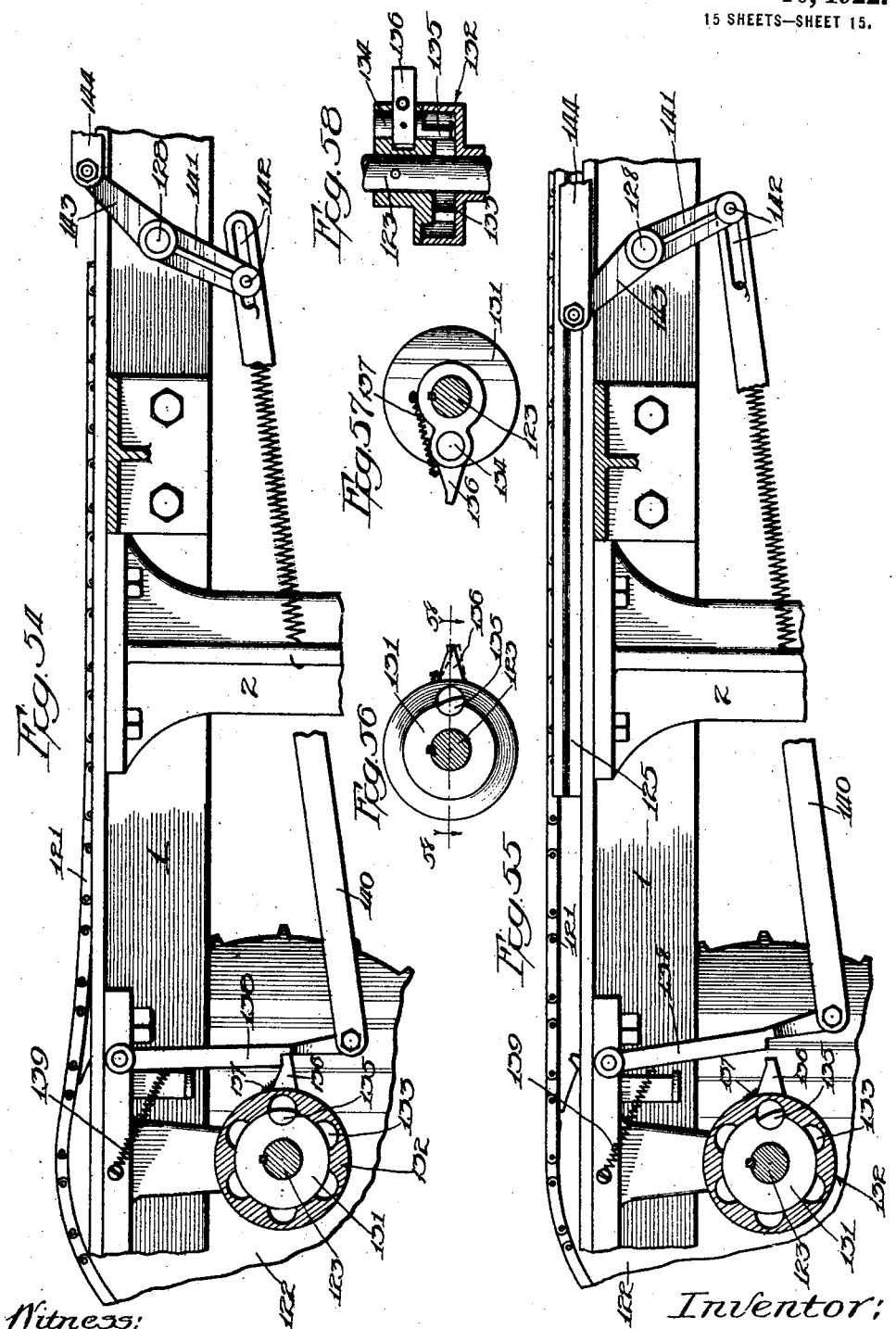

UNITED STATES PATENT OFFICE.

GEORGE HOEPNER, OF CHICAGO, ILLINOIS.

AUTOMATIC WEIGHING MACHINE.

1,402,934.  Specification of Letters Patent.  Patented Jan. 10, 1922.

Application filed January 26, 1920. Serial No. 354,162.

*To all whom it may concern:*

Be it known that I, GEORGE HOEPNER, a citizen of the United States, residing at Chicago, county of Cook, State of Illinois, have invented a certain new and useful Improvement in Automatic Weighing Machines; and declare the following to be a full, clear, and exact description of the same, such as will enable others skilled in the art to which it pertains to make and use the same, reference being had to the accompanying drawings, which form a part of this specification.

Viewed in one of its aspects my invention may be said to have for its object generally to improve the construction and operation of machines for automatically weighing loose material.

Viewed in another of its aspects my invention may be said to have for its object to produce a simple, novel and efficient machine for delivering predetermined quantities of material into containers in which the material is being weighed without having the accuracy of the weighing affected by variations in the weights of individual containers.

Viewed in another of its aspects my invention may be said to have for its object to produce a simple, novel and efficient machine for carrying receptacles to a predetermined point, delivering material into the receptacles and weighing it therein without loss in accuracy due to variations in the weights of the receptacles, and automatically removing the receptacles from said predetermined point.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a machine arranged in accordance with a preferred form of my invention;

Fig. 2 is a top plan view of the machine;

Fig. 3 is a side view of certain rock shafts and actuating rods therefor, disconnected from a machine;

Fig. 4 is a vertical longitudinal section through the machine;

Fig. 5 is a view similar to Fig. 4 showing the parts in different positions, however;

Fig. 6 is a transverse vertical section taken approximately on line 6—6 of Fig 2;

Figs. 7, 8, 9, 10 and 11 are views similar to Fig. 6, each figure, however, showing a different position of the parts from that which they occupy in the other figures;

Figs. 12, 13 and 14 are enlarged elevations of the delivery mechanism at the top of the weighing machine corresponding in the relation of the parts shown therein to Figs. 6, 8, and 9, respectively;

Fig. 15 is a section on an enlarged scale taken approximately on line 15—15 of Fig. 1;

Fig. 16 is a view similar to Fig. 14, illustrating the opposite side of the mechanism from that shown in Fig. 14;

Fig. 17 is an axial section through one of the clutches controlling the feeding of the material to be weighed, the section being approximately on line 17—17 of Fig. 16;

Fig. 18 is a section taken approximately on line 18—18 of Fig. 17, with the addition of the controlling pawl;

Fig. 19 is a side view of the parts shown in Fig. 17, looking from the right hand side, and the large sprocket wheel being omitted;

Fig. 20 is a vertical section through the auxiliary mechanism below the main scale beam for delivering to a bucket carried by the scale beam a quantity of ballast equal to the weight of the container or other tare carried by the scale beam for the reception of the material to be weighed;

Fig. 21 is a section taken approximately on line 21—21 of Fig. 20, the elevating conveyor being in elevation;

Fig. 22 is an elevation of the mechanism shown in Fig. 20, looking toward the mechanism from the right hand side of the latter figure;

Fig. 23 is a side elevation of the ballast-receiving bucket and the adjacent portion of the apparatus for delivering ballast thereto;

Fig. 24 is a view looking at the parts shown in Fig. 23 from the right hand side of the latter;

Fig. 25 is a side elevation of the parts shown in Fig. 23, illustrating the opposite side from that appearing in Fig. 23;

Fig. 26 is a section taken approximately on line 26—26 of Fig. 20;

Fig. 27 is a section taken approximately on line 27—27 of Fig. 25, the spout being shown in elevation;

Figs. 28, 29, 30 and 31 are similar vertical sections through the counterweighting machines for the main scale beam, including the stationary rest for the main counterweight, each of these four figures illustrating a different condition which arises during the operation of the machine;

Fig. 32 is an enlarged vertical section through the spring lifter acting on the main counterweight;

Fig. 33 is a side elevation of the main scale beam with its immediate supports, together with a controlling lever actuated by the scale beam;

Fig. 34 is a section taken approximately on line 34—34 of Fig. 33, the scale platform or table being shown in elevation;

Fig. 35 is a section taken approximately on line 35—35 of Fig. 33;

Fig. 36 is a side elevation of that part of the scale beam carrying a sliding weight;

Fig. 37 is a section taken approximately on line 37—37 of Fig. 36;

Figs. 38 and 39 are similar views of a locking device for holding the scale beam down in the position to which it is carried by a completed load;

Fig. 40 is a view on an enlarged scale of the feed-controlling lever controlled by the scale beam;

Fig. 41 is a view of the lower end of the mechanism shown in Fig. 40, looking toward the left hand side;

Fig. 42 is a view similar to Fig. 41 showing in dotted lines the same position of the controlling lever as in Fig. 41 and in full lines a different position;

Fig. 43 is a view similar to Fig. 40, only the lower part of the mechanism being shown, and the parts being illustrated in different positions than in Fig. 40;

Fig. 44 is a top plan view of one end of the setting device for the controlling lever, the actuating finger being shown in full lines in the operative position and in dotted lines in an idle position;

Fig. 45 is a view looking toward the left hand side of Fig. 40, containing some elements not present in Fig. 40 and showing two different positions of the controlling lever in full and dotted lines respectively;

Fig. 46 is a detail of the spring-held plunger actuated by the feed-controlling lever, the plunger being in its normal idle position;

Fig. 47 is a view similar to Fig. 46 showing the plunger in the position to which it is moved by the feed-controlling lever in order to start the feeding of the material to be weighed;

Fig. 48 is an axial section through the plunger and the adjacent end of the rocker arm in which it is supported, the parts being in the positions illustrated in Fig. 46;

Fig. 49 is a view on an enlarged scale of a fragment of the conveyor mechanism and means for controlling the same;

Fig. 50 is a view similar to Fig. 49, the parts being shown in different positions than in the latter figure;

Fig. 51 is a section taken approximately on line 51—51 of Fig. 50, showing only the chain or conveyor elevating track with the immediate actuating parts therefor;

Fig. 52 is a section taken approximately on line 52—52 of Fig. 51, only the sprocket wheel and the hooked rod adapted to be actuated thereby being shown;

Fig. 53 is a view looking down upon the controlling cam and rod adapted to be actuated thereby at the left hand end of Fig. 50;

Fig. 54 is an enlarged vertical section showing a fragment of the endless conveyor, the controlling clutch and immediate actuating means for the controlling clutch;

Fig. 55 is a view similar to Fig. 54 showing the parts occupying different positions than those illustrated in the latter figure;

Fig. 56 is a section taken transversely to the main shaft at the left hand end of Fig. 55, the clutch being shown in elevation;

Fig. 57 is a view similar to Fig. 56 showing, however, the opposite side of the clutch; and Fig. 58 is a section taken approximately on line 58—58 of Fig. 56.

My improved machine as a whole consists of a weighing machine having an automatic ballast weighing and delivering means adapted to compensate for variations in the weight of containers into which the material to be weighed is delivered, prior to the beginning of the delivery of such material; together with an endless conveyor and means for controlling the same so that a container is carried to and deposited upon the platform of the weighing machine and, after the aforesaid compensation has been made and the container has received a predetermined charge, is removed from the scale platform and automatically carried to a discharge point.

The machine as illustrated comprises an elongated horizontal frame or open table, 1, supported at a suitable elevation upon suitable standards or pedestals, 2. A scale beam, 3, extends transversely beneath the table, its inner end being at approximately the longitudinal center of the table and it being supported between its ends by having a suitable bearing, 4, on a heavy bracket, 5, arranged underneath the table; the outer end of the beam carrying a depending rod, 6, counterweighted as hereinafter explained. Arranged above the inner end of the scale beam is a suitable platform, 7, supported on the scale beam by means of suitable bearings, 8; the inner end of the scale beam being forked so that there are two of the platform supporting bearings, arranged in a vertical plane containing the longitudinal axis of the machine. A rod, 9, fixed rigidly to the platform hangs downwardly therefrom and, with the parts carried upon its lower end to be hereinafter described, serves to maintain the platform with its work-supporting surface in a horizontal plane regardless of tilting movements of the scale beam. The work-supporting part of the platform is preferably made up of a series of parallel ribs, 10, extending lengthwise of the table and of considerable depth so as to permit the passage between them of the chains of the endless conveyor to be hereinafter described. The scale beam is provided with an auxiliary counterbalancing arm, 11, which is preferably graduated, (as illustrated in Fig. 36) and carries an adjustable sliding weight, 12.

On the main frame of the machine is a bracket having a laterally-projecting arm, 13, lying directly underneath and some distance below the counterbalancing arm of the scale beam. The rod 6 hangs down through a large opening, 14, in the stationary member 13, as best seen in Figs. 28 to 31; the member 13 being preferably provided with an overlying ring, 15, roughly triangular in cross section, surrounding the opening 14, the apex of the triangle being at the top. Loosely surrounding the rod 6 is the main counterweight, 16, which is adapted to rest upon the ring 15. On the rod 6, below the counterweight 16, is fixed a collar, 17, which, when the rod is lifted far enough, will engage the counterweight and lift the latter. On the lower end of the rod 6 is an auxiliary counterweight, 18. While a load to be weighed is being delivered, the main counterweight rests upon the stationary support and, when the delivery of the load or charge has been completed, the main counterweight must of course be clear of the stationary support. There are various reasons why it is desirable that the main counterweight be lifted before the complete charge or load has been delivered, among which reasons are the desirability of securing a partial overbalancing of the scale beam to produce a dribble stream as will hereinafter be explained, and also the desirability of insuring against inaccuracy due to possible variations in the speed at which a balancing of the scale beam takes place. I have therefore provided means acting in opposition to the main counterweight so as to cause the counterweight to be lifted before the load or charge is completed, such means being then withdrawn so that the final weighing of the load is independent thereof. In the arrangement shown, there is secured on the under side of the stationary frame member 13 a vertical cylindrical chamber or housing, 19, within which is a long plunger, 20, the upper end of which projects through the part 13 and the overlying stationary ring and is adapted to engage with the under side of the main counterweight when the latter is resting upon the ring. The plunger is provided with a collar, 21, as best seen in Fig. 32, which limits the upward movement of the plunger. Within the casing or housing, 19, below the collar, 21, is a compression spring, 22, which rests at its lower end upon a vertically-adjustable plug, 23, closing the bottom of the casing or housing. The collar is so located on the plunger that when the counterweight comes to rest upon its stationary support it engages with the plunger and depresses it against the compression of the spring. Therefore the spring is constantly acting on the stationary weight in the direction tending to lift it. The collar on the plunger is so positioned that the upward movement of the plunger is arrested whenever the main counterweight has been lifted only a part of the distance from its position of rest to its poising position, so that after the counterweight has once been positively lifted off its seat the poising of the scale beam becomes independent of the auxiliary device. The plug 23 is preferably made of considerable length and screw threaded into the casing or housing so that the initial tension of the spring may be varied.

On the lower end of the rod 9 which depends from the scale platform is a bucket, 25. Between the bucket 25 and the rod 6 that is, between the rods 6 and 9, is an auxiliary scale beam, 26, pivotally supported between its ends, as indicated at 27, on a part of the stationary frame of the machine. Normally, when the machine is empty, the scale platform and the bucket hung from the same are in their elevated positions and the counterweights are in the positions illustrated in Fig. 28. When a container, such as an empty box, A, is placed upon the scale platform no change takes place in the positions of the scale beams; the parts being so proportioned that the initially effective counterbalancing means are more than sufficient to overbalance any container which is adapted to be passed through the machine; thus making it necessary to add to the weight of the container an increment to secure poising of the auxiliary scale beam. This additional increment is provided in the form of ballast delivered into the suspended bucket, 25. It will of course be understood that the collar, 17, on the main counterweight rod 6 does not move completely from the position shown in Fig. 28 to that shown in Fig. 29 until after sufficient ballast has been delivered to the bucket to bring the combined weight of the container and the ballast to an exact predetermined amount; so that the main counterweight does not come into play until the actual delivery of the goods to be weighed begins and it is this main counterweight which finally is the sole factor in determining the net weight of the contents of the container.

The delivery of the ballast is affected as follows: The bucket 25 hangs within a hopper, 28, the lower end of which communicates with the lower end of a casing, 29, in which is arranged a vertical conveyor, 30, carrying suitable scoops, 31; the bottom of the casing 29 being preferably semi-cylindrical so that the scoops on the conveyor will sweep along the surface thereof in making the turn at the bottom. On the side of the casing toward the hopper is a spout, 32, having a vertical inner end, 33, open at the top and lying close to the path of the descending buckets and having an open lower end lying directly above the ballast-receiving bucket, 25. The conveyor is suitably driven in a continuous manner when the machine is in operation, conveniently by means of a sprocket chain, (see Fig. 6), 34, passing over a suitable sprocket wheel on the main driving shaft, 35, of the machine and over a sprocket wheel on the shaft, 36, which carries the uppermost pulley or wheel, 37, around which the conveyor passes. A suitable quantity of shot, 38, or other suitable loose material is placed in the ballast casing, 29, and, when the conveyor is in motion, the scoops pick up the ballast and deliver it into the upper end of the spout. The outlet end of the spout is controlled by a swinging gate valve, 40, the edge of which may come in contact with a stationary brush, 41, or other suitable flexible device when the valve is in its closed position, so as to prevent leakage of the ballast from the spout. When free to do so, the valve swings into its closed position, illustrated in Figs. 20 to 27. Referring to these figures it will be seen that at one side thereof the valve has a laterally-projecting pin, 42, spaced apart from the pivotal axis, 43, of the valve. The ballast bucket, 25, has a finger, 44, in position to engage with the pin 42 when the bucket rises, so that the upward movement of the bucket swings open the valve. On the opposite side of the valve is a laterally-projecting finger, 45, overlying one end of a pivoted counter-weighted lever, 46, having in the upper edge a notch, 47, so located that when the valve is open the finger 45 drops into the notch; the counterweighted lever thus serving as a catch to lock the valve in its open position and relieving the bucket of the weight of the valve so that as the ballast enters the bucket, the poising of the scale beams is not interfered with by the valve. As soon as the valve opens the ballast begins to flow into the bucket and, when a proper amount has been delivered to make up the difference between the weight of a container on the main scale platform and some predetermined weight, it is necessary again to close the valve. The closing of the valve is conveniently accomplished by securing upon the depending rod 9 a laterally-projecting arm, 48, having a part, 49, directly overlying the free end of the catch lever 46; the parts being so proportioned that when the bucket descends under the weight of the ballast, a part, 49, engages with the catch lever and presses it down far enough to release the valve which then automatically closes by reason of its own weight.

The bottom of the ballast bucket is closed by a door, 50, hinged to the sides of the bucket as indicated 51. Between an ear, 52, on the rear side of the bucket and an ear, 53, on the door 50 is a toggle lever, 55, the two members of which, when the door is closed, lie in a straight line and lock the door in it closed position. The upper member of the toggle is provided with a lateral weighted extension, 56, which serves to straighten the toggle and cause the door to close when free so to do. The contents of the ballast bucket are discharged when the bucket descends to a predetermined lower level than that at which the ballast valve is caused to close; this being accomplished as best shown in Fig. 10, by reason of the fact that the free end of the weighted arm or extension, 56, of the toggle lever strikes a stationary stop, 57, lying in its path; thus causing the two members of the toggle to be swung out of alignment with each other and permitting the weight of the ballast in the bucket to act on the door and swing it open. This emptying of the ballast bucket cannot take place immediately after the proper amount of ballast has been delivered for the reason that before the bucket descends to the discharge point or level the collar on the main counterweight rod, 6, strikes against the bottom of the main counterweight as illustrated in Fig. 29, and further downward movement of the ballast bucket is prevented until sufficient material has been delivered into the container on the scale platform to cause the main counterweight to be lifted to the position illustrated in Fig. 31. In other words, the ballast cannot be discharged until a complete load has been delivered into a container on the scale platform, Fig. 31 simply representing the condition of the parts at the completion of a weighing operation.

It will be understood that the ballast is delivered to the spout above the ballast conductor more rapidly than it will be required during the operation of the machine, the excess simply flowing back into the casing or housing over the top of the spout if the spout happens to become full, so that there will always be sufficient ballast in the spout to provide a proper charge for the ballast bucket.

It will be seen that if no means were provided for preventing it, the ballast bucket would immediately rise to its highest level and would receive a new supply of ballast immediately upon the discharge of the ballast, before a new container could be placed on the scale platform, and possibly even before the filled container was removed. To prevent this from occurring I have provided means for locking the scale mechanism in the position which it takes when a load has been completely weighed and the ballast has been discharged, as illustrated in Fig. 11. As best seen, perhaps, in Figs. 4, 5, 38 and 39, there is on the rod 9 a collar, 59, above which lies a dog, 60, pivotally hung at its upper end, as at 61, on a part of the stationary structure of the machine. The parts are so proportioned that when the scale mechanism is in the position illustrated in Fig. 11, the dog may be swung so as to lie directly above the collar 59 and serve as a strut or post to prevent upward movement of the rod 9 until released from the dog as will hereinafter be described.

After the proper amount of ballast has been delivered to the weighing mechanism to make the weighing of the material to be weighed independent of the weight of the container, the container is ready to receive its charge or load.

Supported directly above the scale platform is a stationary delivery funnel, 62, and above the latter is the open lower end of the discharge spout, 63, of a delivery hopper, 64. The mouth of the spout 63 is closed by a swinging valve, 65, which is preferably counterweighted so as to reduce the stresses in the actuating parts. The valve is connected to an arm, 66, projecting radially from a rock shaft, 67, by means of a link, 68. A long arm, 69, projects radially from the rock shaft and is adapted to have its free end engaged by either of two shoulders, 70 and 71, on a holding catch, 72. When the arm is clear of the catch as shown in Fig. 12, the feed valve is closed. When the arm is swung down so as to be engaged by the lowermost shoulder, 70, of the catch, as illustrated in Fig. 13, the feed valve is locked in its wide open position. When the arm is being engaged and held by the upper shoulder, 71, of the catch, as illustrated in Fig. 14, the feed valve is only partially open, providing a dribble stream. The catch, 72, is controlled by the main scale beam. As will appear from the figures of the drawings to which reference has just been made and to Fig. 8 et seq., the catch 72 is pivotally supported at its lower end by a small bracket, 73, fixed to a part of the frame of the machine. A cross-arm, 74, is secured to and extends radially in opposite directions from the shaft or pivot, 75, of the catch. On one end of the cross-arm is an adjustable counterweight, 76, and to the other end is connected a depending rod, 77, the lower end, 78, of which is made pointed as shown in Fig. 36; this pointed end lying directly above a smooth hardened surface, 79, on the counterweighted end of the main scale beam. The parts are so proportioned that as long as the main counterweight rests upon its stationary support as illustrated in Fig. 28, the scale beam does not engage with the catch-actuating rod, 77; the catch being yieldingly held in a working position so that when the arm, 69, associated with the feed valve is pressed down into the position shown in Fig. 8, it will be automatically locked down and the material to be weighed, as indicated at B, will begin to flow from the hopper through the wide open end of the discharge spout, through the funnel 62, and into a container, A, on the main scale platform. The material continues to flow into the container until the charge or load has been almost completed, whereupon the lifting effort of the spring-pressed plunger 20 acting on the under side of the main counterweight, causes the counterweight to be lifted to the position illustrated in Fig. 30 which is also the position illustrated in Fig. 9. This upward movement of the main counterweight is accompanied by a sufficient rise in the corresponding end of the main scale beam to cause the latter to engage with the lower end of the catch-controlling rod, 77 and lift the latter just far enough to cause the catch to swing on its axis a sufficient distance to permit the valve-controlling arm, 69, to be released from the shoulder 70. The valve, as will hereinafter be explained, tends constantly to close automatically and therefore, as soon as the controlling arm is released from the shoulder 70 on the catch, the valve begins to close; but the valve is not permitted to close completely because the controlling arm is caught by the shoulder 71 at the upper end of the catch device, the valve being thus locked in a partially open or dribble position, as illustrated in Fig. 9. The material is now delivered in a thin stream, the main counterweight rises, and finally a nice balance is secured, the main counterweight rising to the position illustrated in Fig. 31 and in Fig. 10; the weighted end of the scale beam having now risen high enough to lift the catch-actuating rod so far as to swing the catch into a completely inoperative position and release the controlling arm for the feed valve so that the feed valve becomes fully closed and shuts off all delivery of material. The ballast bucket has now reached the discharging position and discharges its contents into the underlying hopper. As soon as this occurs the weighted ends of the scale beams tend to sink because the filled container alone is not heavy enough to overbalance them; but in the meantime the locking dog 60 has been shifted into its locking position, as will hereinafter be explained, and the counterweighted ends of the scale beams are prevented from descending until a later point in the cycle of operations is reached. When the ballast bucket is again lifted, the door in the bottom closes before the bucket rises far enough to open the ballast-controlling valve, 40.

In order to make the machine automatic it is necessary that the main feed valve be opened automatically when the proper conditions exists for the feeding of material to begin. The opening of the valve is effected by means of a cam, 80, secured to a sprocket wheel, 81, rotatable on a shaft, 82, extending transversely through the main supply hopper 64; the sprocket wheel being continuously driven by means of a sprocket chain, 83, driven from the main shaft, 35, as will best be seen in Figs. 1 and 2. On the rock shaft, 67, to which the controlling arm 69 for the feed valve is fixed, is a radially-projecting arm, 84, which lies below and somewhat to one side of the plane of travel of the cam 80. In the free end of this arm is a pin, 85, parallel with the axis of rotation of the cam and movable in the direction of its length. This detail is best illustrated in Figs. 45 to 48. On the outer end the pin is provided with a flanged anti-friction device, 86. On the inner end of the pin is a collar, 87, having a skirt-like part, 88, extending toward the supporting arm; the distance between the anti-friction member and the inner end of the skirt being considerably greater than the thickness of the arm. A compression spring, 89, surrounds the pin, one end bearing against the collar and the other against the adjacent side of the arm. The parts are so proportioned that when the pin is pushed outwardly against the tension of the spring, as far as it will go, the anti-friction member lies in the plane of the cam 80 so that the latter will strike the anti-friction member at one point in its revolution, thus depressing the arm carrying the pin and its anti-friction member and opening the feed valve. Normally the spring holds the pin in the positions illustrated in Figs. 46 and 48 and in full lines in Fig. 45, holding the anti-friction member at one side of the path of travel of the cam. The controlling means for the pin 85 consists of a long lever, 90, supported between its ends, as indicated at 91, preferably by means of a universal joint, on the stationary superstructure, 92, of the frame of the machine. The upper end of the lever extends into proximity to the inner end of the pin 85. The lower end of the lever extends into proximity to a cam, 93, on the main shaft 35. A spring, 94, between the lever and the frame tends normally to hold the lever in such a position that its upper end just touches the inner end of the pin while the lower end lies in the plane of the cam, 93, but at such a radial distance from the axis of the main shaft that the lever does not touch the cam. These conditions are clearly shown in dotted lines in Fig. 40 and in full lines in Fig. 45. The parts are so proportioned that when the lower end of the lever is depressed sufficiently to bring it to rest upon the main shaft, the cam 93 will act on the lever to move its adjacent end lengthwise of the shaft and its opposite end against the inner end of the pin 85 and move the pin far enough to bring the anti-friction member thereon into the path of the cam 80, all as shown in dotted lines in Fig. 45. The shifting of the lever 90 into operative relation to its actuating cam is brought about through means controlled by the scale beam. In the vicinity of the same transverse plane as that in which the lever 90 lies is a controlling lever, 95, therefor. The relation of this lever with the rest of the machine is best shown in Fig. 2. It will be seen that the lever is pivoted between its ends, as indicated at 96, so as to be movable in a vertical plane about a horizontal axis between its ends. The lever 95 extends entirely across the machine, its one end being forked as indicated at 97 in Fig. 33, the fork engaging with a pin, 98, on the scale beam, the parts being so arranged that when the counterweighted end of the scale beam descends the end of the lever 95 in the vicinity of the main shaft 35 rises. On the latter end of the lever 95, as best shown in Figs. 40 to 45, is hung a dog, 99, the dog being pivotally connected at its upper end to the end of the controlling lever, as indicated at 100. The dog is provided with a laterally-projecting finger, 101, adapted to engage with the side of the supporting lever to limit the swinging movement of the dog. In Fig. 44 the dog is illustrated in full lines in its normal position while in dotted lines it is shown in an inoperative position, the pin 101 engaging with the opposite side of the supporting lever from that with which it engages when in its normal position. On the lower end of the lever 90 is a laterally-projecting finger, 102, having at the free end and upwardly-facing concave seat, 103, normally lying in the same vertical plane as that occupied by the lower end of the dog 99 when the latter is in its operative position. The parts are so proportioned that when the counterweighted end of the scale beam is at the lowermost limit of its movement, the lever 95 will be held in the position in which the dog hangs directly above the curved seat, 103, as illustrated in Fig. 40. Then, after an empty container has been set on the scale platform and the compensating ballast has been supplied, so that the container is ready to receive its load, the scale beam will be tilted far enough to cause the lever 95, acting through the dog 99 and finger 102, to shift the lower end of the lever 90 from the dotted line position in Fig. 40 to the full line position. Then, as the main shaft revolves, the cam 93 will shift the lever 90 from the position shown in full lines in Fig. 45 to the position shown in dotted lines. Thereafter, as heretofore explained, the cam 80 will engage with the anti-friction member on the end of the rocker arm, 84, causing the rock shaft 67 to be turned and the feed valve to be opened to its full extent. In other words, as soon as the conditions have been properly prepared for the reception of the load by a container, the main feed valve will be opened and the material caused to flow into the container. The movement produced in the lever 90 by the cam 93 is such that the finger 102 is carried laterally from underneath the dog 99 during the operation just explained, permitting the dog to drop down beside the finger as illustrated in Fig. 43; thus leaving the lever 95 entirely free to swing under the influence of the scale beam while at the same time the parts are left in the condition to be properly set at the completion of the weighing of the load.

So far as most materials are concerned it is desirable, for the sake of economy of time, that they be positively fed. To this end I place on the shaft 82, within the main hopper 64 any usual or suitable rotary feeding device, 104, which will feed the material to be weighed to the delivery spout 63. It is furthermore desirable that the speed at which the positive feeding device is operated be reduced when the stream of material which is being discharged is throttled down from a full stream to a dribble. I have therefore provided means for driving the shaft at two different speeds, controlling such means from the rock shaft, 67, whose angular position relatively to its axis varies with the position of the main feed valve. For driving the feed device at a high speed I employ a clutch between the sprocket wheel 81 and the shaft 82 and for driving the device at a low speed I provide a suitable clutch between a much larger sprocket wheel, 105, arranged on the opposite side of the hopper from that on which the sprocket wheel 81 is located, and said shaft. These clutches may take any usual or suitable form, the details of a satisfactory form being illustrated in Figs. 17 to 19 inclusive. Referring to these figures, 106 represents a heavy collar loose on the shaft 82. Beside the collar and fixed to the shaft, is a small ratchet wheel, 107, engaged by a spring-held pawl, 108, pivotally mounted on the side of the collar. On the opposite side of the collar from that on which the ratchet wheel is located, is the driving sprocket wheel which is either the wheel 81 or the wheel 105, having a projecting hub, 109, cupped on the side toward the collar. In the interior of the shell of the hub are distributed a series of semi-circular grooves or recesses, 110, extending parallel with the axis of the shaft. Rotatably supported in the collar is a cylindrical block 111, having its axis at the same radial distance from the axis of the shaft as are the axes of the grooves or recesses. The member 111 is provided at one end with a semi-cylindrical projection, 112, which, it will be understood, can either be seated in any one of the recesses or grooves 110 or be turned into an inoperative position, as illustrated in Fig. 17, so as to lie clear of said grooves or recesses. In the one case the sprocket wheel and the collar are coupled together while in the other case the sprocket wheel is free to turn independently of the collar. The means for shifting the member 111 from one position to another consists of a ratchet wheel, 113, surrounding and movable circumferentially on the collar; the member 111 having a radial pin or finger, 114, which projects outwardly beyond the periphery of the collar into the space between two separated lugs, 115, on the ratchet wheel 113. When the ratchet wheel is turned in one direction relatively to the collar it turns the member 111 into its clutching position while, upon a relative movement between the ratchet wheel and collar in the opposite direction, an unclutching is effected. A spring, 116, between the collar and the ratchet wheel 113 tends constantly to bring the two into such a relative position as to cause the sprocket wheel and the collar to be coupled together. It will be seen that by providing suitable pawls co-operating with the ratchet wheel 113 of each clutch and properly manipulating the pawls, either or both clutches may be thrown in at will. If both clutches are thrown in, then the pawl 108 associated with the more slowly rotating sprocket wheel, namely the large sprocket wheel 105, will simply ride idly on its co-operating ratchet wheel which is being carried ahead by the more rapidly moving sprocket wheel. In the arrangement shown I have fixed a pawl, 117, as best shown in Fig. 16, which engages with the ratchet wheel, 113, forming part of the clutch associated with the slowly rotating sprocket wheel 105 only when the controlling finger 69 is at the upward limit of its movement that is, when the main feed valve is closed. Therefore when the feed valve is in either of its two definite open positions the low speed clutch is in. There is a second pawl, 118, projecting radially from the rock shaft for co-operation with the ratchet wheel 113 of the other clutch. The pawl 118 has capacity for a limited angular movement on the rock shaft; this being conveniently brought about by a pin and slot connection as indicated at 119 in Figs. 12 and 40; a counterweight, 120, being associated with the pawl 118 and acting in a direction to swing the pawl into engagement with the co-operating ratchet wheel whenever the controlling arm 69 is held by the shoulder 71 of the catch, namely whenever the valve is in the dribble position; and the extent of the limited relative motion between the pawl and the rock shaft being such as to permit the valve to close from its dribble position while the pawl remains stationary in contact with the ratchet wheel. Thus the high speed clutch is thrown in only when the valve is wide open while the low speed clutch is in whenever the valve is wide open and also whenever the valve is in its dribble position.

There remains to be described only the means for automatically delivering the containers to the scale platform and again automatically taking them away, all in proper time relation to the weighing operations heretofore described. The containers, filled and empty, are adapted to be supported and moved by an endless conveyor which may conveniently consist of two endless sprocket chains, 121, passing over sprocket wheels, 122, fixed to suitable transverse shafts, 123 and 124, revolubly supported at opposite ends of the machine. The upper runs of the sprocket chains 121 pass through the spaces between the ribs 10 of the scale platform. For the greater portion of their lengths the upper runs of the chains lie in parallel channel-shaped tracks or rails, 125, which are free to move in the vertical direction. Just below the top of the table of the machine are a series of transverse shafts, 126, 127 and 128, each provided with a pair of radially-projecting lugs or cams, 129, lying directly underneath the vertically movable rails. The parts are so proportioned that when the several shafts are turned so as to bring the lugs or cams to the top the rails will be lifted high enough to bring the upper edges of the chains above the plane of the supporting surface of the scale platform; the channels in the tracks themselves being shallower than the vertical thickness of the chains so that when the tracks and chains are raised a container which may have been resting on the scale platform will be lifted therefrom by the chains and may thereafter be carried away thereby; whereas, when the said shafts are oscillated through a quarter turn, more or less, the lugs or cams will cause the rails or tracks and the conveyor itself to be lowered below the supporting surface of the scale platform, although not low enough to rest on any part of the platform which connects the ribs of the latter together. In this way, an empty container may be set upon the conveyor at one end of the machine, be brought to the scale platform, lowered upon the latter, filled as heretofore described without having the conveyor interfere in any way with the weighing operation, and then be lifted from the platform and carried to the other end of the machine.

The movement of the conveyor and the raising and lowering of the upper runs thereof is controlled by the weighing mechanism. Loose on one end of the shaft 123 is a fly wheel, 130, between which and the shaft is a clutch of any suitable type, a suitable clutch being shown in detail in Figs. 54 to 58. Referring to these figures, 131 represents a collar fixed upon the shaft. Surrounding the collar and driven from the fly wheel is a drum or shell, 132, having therein a series of semi-circular grooves or recesses, 133, lying parallel with the axis of the shaft. The collar 131 is provided with a cylindrical part, 134, having its axis at the same distance from the axis of the shaft as are the axes of the grooves or recesses 133. At one end the member 134 has a semi-cylindrical projection, 135, which extends into the shell or drum 132 and serves in the usual way as the clutching member between the collar and the shell or drum. A finger, 136, projects radially from the member 134 and a spring, 137, associated with this finger tends constantly to turn it in a direction to throw in the clutch. On the frame of the machine in the vicinity of the clutch is hung a catch, 138, which tends constantly, through the action of a spring, 139, or otherwise, to swing into the path of rotation of the finger 136, provided the shaft 123 is turning and, by engaging with the finger, throw out the clutch. The catch 138 is moved into and held in a release position by means of an actuating bar, 140, extending between the free end thereof and an arm, 141, projecting radially from the rock shaft, 128. There is a pin and slot connection, 142, between the members 140 and 141 so as to permit a limited relative movement between the two. The rock shaft, 128, as well as the similar rock shafts 126 and 127, is provided with a radial actuating arm, 143. A connecting rod, 144, as best shown in Fig. 3, connects all three of the arms 143 together so that when one of the shafts is oscillated, the others are oscillated in unison therewith. The shaft 127 has another radially-projecting arm, 145, to which is hinged one end of an actuating rod, 146, having at its free end a hook, 147. In the vicinity of the hooked end of the actuating rod 146 is a sprocket wheel, 148, driven through suitable gearing, 149, (see Fig. 2,) from the main shaft 35; which sprocket wheel, through a sprocket chain, 150, drives the fly wheel 130. The sprocket wheel 148, as is best shown in Figs. 49, 50 and 52, carries a laterally-projecting pin, 151, placed at some distance from the center; the parts being so proportioned and arranged that when the free end of the actuating rod or bar 146 is pressed down as illustrated in Fig. 49, the pin 151 is adapted to engage the hook and pull the rod 146 longitudinally. In other words, assuming that the shafts 126, 127 and 128 are in the positions in which the main driving clutch is thrown out and the conveyor-supporting tracks are down, as illustrated in Figs. 49 and 54, then when the hooked bar 146 is depressed the sprocket wheel, 148, becomes the actuator for oscillating these shafts into their other extreme position, such as illustrated in Figs. 50 and 55, in which the clutch is thrown in and the conveyor-supporting tracks or rails are raised. The hooked end of the actuating rod 146 is normally held raised by means of a spring, 152. For the purpose of depressing the member 146 so as to bring it into operative relation to the driving pin on the constantly driven sprocket wheel, there is hung a weight, 153, from an arm, 154, fixed to and projecting radially from the rock shaft 67 associated with the feed mechanism. The parts are so proportioned that when the main feed valve swings into its closed position, the weight, 153, drops down upon an upwardly-projecting lug, 155, on the member 146, as best shown in Fig. 1, thus causing the hooked end of the member 146 to be pressed down. Then, when the member 146 is drawn lengthwise, the lug 155 passes out from under the weight 153 and, as soon as the pin on the sprocket wheel clears itself of the hook, the spring 152 is free to lift the member 146 without interference on the part of the weight; the condition being now as illustrated in Fig. 5.

When the shafts 126, 127 and 128 have been oscillated to lift the upper run of the conveyor and throw in the driving clutch for the conveyor, an empty container set upon the left hand end of the machine as viewed in Fig. 5 will be carried toward the right, that is toward the scale platform, and a container which has just been filled, will have been lifted from the scale platform and will be carried toward the right hand end of the machine either to be left there to be lifted off by a workman or to be slid off on a suitable support or table, not shown. After the conveyor has been set in motion it is necessary again to bring it to rest after it has traveled a predetermined distance, namely the exact distance necessary to carry the empty container from the starting point to a position just over the scale platform. Whenever the conveyor stops, its upper run should of course be lowered so that an empty container carried thereby will be deposited upon the scale platform. The mechanism for actuating the shafts 126 to 128 to stop the conveyor and lower its upper run is best shown in Figs. 4 and 5 and Figs. 49, 50 and 53. Referring to these figures it will be seen that the shaft 128 is provided with a radially-projecting arm, 156, to which is attached an actuating rod, 157. The free end of the member 157 extends across the top of the driving shaft 124 and there is bent laterally, as indicated at 158, to form a hook lying in the path of rotation of a cam, 159, fixed to the shaft. The parts are so proportioned that when the conveyor is running the hooked end, 158, of the actuator 157 lies close enough to the shaft 124 to be engaged by the cam and cause the shaft 128 and therefore the shafts 126 and 127 to be turned in the direction to lower the upper run of the conveyor and throw out the driving clutch for the conveyor. In other words, the actuator 146 positively turns the shafts 126, 127 and 128 in one direction, while the actuator 157 positively turns these shafts in the opposite direction. It is not necessary that the cam 159 be high enough to move the actuator 157 the entire distance because, after the cams or lugs 127 have been swung slightly out of their vertical positions, the weight of the superposed parts will serve to complete the turning movement thereof. The reason for the lost motion between the clutch-releasing rod, 140, and the rocker arm, 141, on the shaft 128 will now be apparent. It is not desirable that the conveyor shall begin to move before the upper run thereof has been raised. Therefore, by providing the pin and slot connection, 142, between the connecting rod 140 and the rocker arm 141, the shaft 128, together with the shafts 126 and 127, may be rotated through an appreciable angle before the lost motion is taken up, namely before the catch 138 is withdrawn from the finger 136 of the clutch, and therefore the tracks or rails will be raised before the clutch is thrown in, that is before the conveyor starts to travel. It will thus be seen that if an empty container is placed at a predetermined point on the conveyor at the receiving end of the machine it will be carried by the conveyor through a predetermined distance, namely directly over the scale platform, and will then be lowered down upon the platform; and, after it has received a discharge or load, the container will be lifted from the platform and, after the container is clear of the latter, the conveyor will again be set in motion and carry it a predetermined distance in the direction of the discharge end of the machine.

As heretofore explained, a catch is provided for holding the load-receiving end of the scale beam down after a load has been weighed and until an opportunity has been given to deliver an empty container to the scale platform; said catch, in the arrangement illustrated, taking the form of the swinging dog 60, as best shown in Figs. 4, 5, 38 and 39. A rod or bar, 160, is connected at one end to the dog and at its other end lies upon or projects across one of the rail-lifting shafts 127. On this shaft is a disc or collar, 161, from one side of which project two pins, 162 and 163; these pins being spaced apart angularly of the disc or collar. The member 160 has on its free end a lug or finger, 164, which lies in the space between and in the path of said pins. The parts are so proportioned that when the rail-lifting shafts are oscillated in the direction to lift the rails,—this being brought about by mechanism set into motion by the tilting scale beam at the end of a weighing operation as heretofore explained,—the pin 162 engages with the lug or finger 164 and moves the rod 160 in such a direction and to such an extent that the locking dog drops over the collar 59 as shown in Fig. 39. Consequently the load-receiving end of the scale beam is locked down until the dog is again swung out of the way. When the rail-lifting shafts are again turned back to lower the rails and throw out the conveyor clutch, the pin 163 engages with the lug or finger 164 and causes the locking dog 60 to be positively swung into a release position as shown in Fig. 38. Consequently the scale beam cannot assume a position in which it causes material to be fed from the main supply until after the conveyor has had an opportunity to carry away a filled container and deliver an empty container to the scale platform.

Briefly stated, the cycle of operations is as follows: An empty container being placed at a predetermined point on the left hand end of the machine and the main driving shaft being set in motion, the conveyor will travel until it brings the empty conveyor above the scale platform; whereupon the conveyor will stop and the upper run thereof will be lowered so as to permit the container to rest upon the scale platform. The lowering of the container upon the scale platform is accompanied by a shifting of the dog by means of which the scale platform is prevented from rising and therefore the counterweighted end of the main scale beam will descend and the scale platform and the empty ballast bucket will rise to the uppermost limits of their movement; the ballast-controlling gate being thus opened and ballast being fed into the ballast bucket until the combined weight of the container and of the ballast equals a definite predetermined amount. During this time the feed valve for the material to be weighed is closed but, when the scale platform rose to its highest point the controlling dog 99 was brought into operative position above the concave seat at the lower end of the lever 90 so that when the main scale beam swings partly toward its poising position on account of the addition of the ballast, said dog is carried down to bring the lever 90 into engagement with the cam on the main shaft; the result being that the main feed valve is opened as soon as the ballasting has been completed. The material is now fed at a high speed and in large volume into the container until almost the entire load has been delivered, whereupon the counterweighted end of the scale beam will rise as far as it can go with the assistance of the auxiliary lifting device below the same. This last mentioned movement of the scale beam partially trips the catch which holds the main feed valve open and permits the latter to close to its dribble position; and at the same time the high speed feed mechanism is thrown out of action and the low speed feed mechanism is thrown in. The delivery of material to the container is then in the form of a comparatively light stream which continues until the load has been completed, whereupon the loaded end of the scale beam will descend and the counterweighted end rise so as completely to trip the catch and thus permit the feed valve to close. As soon as the feed valve closes the upper run of the conveyor is elevated so as to lift the full container from the scale platform and then the conveyor is set in motion so as to carry the filled container to the right hand end of the machine; an empty container being simultaneously brought from the left hand end of the machine to a point above the scale platform. As soon as the conveyor has traveled the required distance the clutches are thrown out so that the conveyor stops traveling and is again lowered so as to transfer the empty container to the scale platform. The downward movement of the end of the scale beam carrying the platform, at the end of the weighing operation, is accompanied by a discharge of the ballast which is then automatically taken up and placed in a position to be used over again; but before the ballast can be emptied the locking dog must come into action so as to lock the scale platform and the ballast bucket in their lowered positions and hold them there until the conveyor has started and stopped and has been raised and again lowered, so that no ballast can be delivered after any weighing operation until a filled container has been removed and an empty container has been placed on the scale platform.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, a weighing machine having a weighing platform, said platform having parallel open channels across the top, an endless conveyor movable in the direction of the length of said channels and having elements passing through said channels, and means controlled by the weighing machine for raising said members high enough to lift a container from the platform and at other times lower said members sufficiently so as to permit a container to rest upon the platform without being in contact with the conveyor.

2. The combination with the scale platform of a weighing machine, of an endless conveyor having elements lying in the vicinity of the said platform and extending a considerable distance in each direction from the platform, and means controlled by the weighing machine for raising and lowering said elements between a position in which a container for the material to be weighed will be held by the conveyor above and out of contact with the scale platform and a position in which such a container will be permitted to rest on the scale platform out of engagement with the conveyor.

3. The combination with a weighing machine having a scale platform, of an endless conveyor having elements extending approximately parallel with the top of said platform and in the vicinity thereof so as to enable the conveyor to move containers to be filled over the top of the platform, and means controlled by the weighing machine for raising and lowering those portions of the conveyor in the vicinity of the platform so as to cause the conveyor at times to hold a container lying above the platform clear of the platform and at other times lower such container upon the platform and clear of the conveyor.

4. The combination with a weighing machine, of a ballast bucket associated therewith, and means controlled by the weighing machine for automatically charging the bucket with an amount of ballast equal to the difference between the weight of an empty container resting on the scale platform and a predetermined weight greater than that of the container.

5. The combination with the scale beam of a weighing machine, of a counterweight, a stationary support for the counterweight, a lifting member for the counterweight extending downwardly through the same, an auxiliary counterweight on the lower end of said lifting member, a shoulder on said lifting member adapted to engage with the main counterweight only after the counterweighted end of said scale beam has moved upwardly a predetermined distance from its lowermost position, a ballast bucket suspended from the load-receiving end of said scale beam, a balancing lever pivotally supported between its ends and connected at its ends respectively to said lifting member and to said ballast bucket, the parts being so constructed and arranged that said balancing lever may assume its poising position before the shoulder on the lifting rod is raised high enough to engage with the bottom of the main counterweight.

6. The combination with a weighing machine having a scale platform, of an endless conveyor constructed and arranged to carry containers to and from said platform, lifting mechanism for that portion of the conveyor in the vicinity of the platform adapted to raise and lower said portion of the conveyor between a level in which the conveyor supports a container clear of the platform and a level in which the conveyor is dropped below a container resting on the platform, and means controlled by the weighing machine for setting said lifting mechanism in motion to elevate the conveyor and then cause the conveyor to travel.

7. The combination with a weighing machine having a scale platform, of an endless conveyor constructed and arranged to carry containers to and from said platform, lifting mechanism for that portion of the conveyor in the vicinity of the platform adapted to raise and lower said portion of the conveyor between a level in which the conveyor supports a container clear of the platform and a level in which the conveyor is dropped below a container resting on the platform, and means controlled by the weighing machine for causing said lifting mechanism to move upwardly and the conveyor to move ahead and then cause the lifting mechanism to be lowered and the conveyor to come to rest.

8. The combination with a weighing machine having a scale beam, of a delivery spout, a valve for said spout tending constantly to close, a movable catch having shoulders arranged one beyond the other, an arm associated with said valve and adapted to hold the valve fully open when in engagement with one of the shoulders and only partly open when in engagement with the other shoulder, means controlled by the scale beam for moving the catch far enough to permit said arm to be released from one of said shoulders and swing into engagement with the other shoulder when the scale beam reaches a predetermined point short of the poising position and to trip the catch far enough entirely to release the arm when the scale beam reaches the poising position, and means acting on the scale beam to assist the load which is being weighed only until the scale beam has been tilted to such predetermined point.

9. The combination with the scale beam of a weighing machine, of a counterweight, a stationary support for the counterweight, a connection including a lost motion between the counterweight and scale beam adapted to permit the counterweighted end of the scale beam to swing upwardly a predetermined distance before being influenced by said counterweight, a ballast bucket associated with the scale beam, an auxiliary counterweighted balancing lever pivotally supported between its ends and connected at one end to said bucket, the parts being so proportioned and arranged that said balancing lever may assume its poising position before the counterweighted end of the scale beam has risen high enough to take up the lost motion between it and its counterweight.

10. The combination with the main scale beam of a weighing machine, of a counterweight, a stationary support for the counterweight, a connection betwen the scale beam and the counterweight including a lost motion, an auxiliary weighing machine connected to the said scale beam and having a balancing member capable of assuming its poising position before the main scale beam has taken up the lost motion between it and its counterweight.

11. The combination with the main scale beam of a weighing machine, of a counterweight, a stationary support for the counterweight, a connection between the scale beam and the counterweight including a lost motion, an auxiliary weighing machine connected to the said scale beam and having a balancing member capable of assuming its poising position before the main scale beam has taken up the lost motion between it and its counterweight, and means for automatically delivering to the auxiliary weighing machine ballast equal to the difference in weight between a container supported by the main weighing machine and a predetermined weight greater than the container.

12. The combination with the main scale beam of a weighing machine, of a counterweight, a stationary support for the counterweight, a connection between the scale beam and the counterweight including a lost motion, an auxiliary weighing machine connected to the said scale beam and having a balancing member capable of assuming its poising position before the main scale beam has taken up the lost motion between it and its counterweight, means for automatically delivering to the auxiliary weighing machine ballast equal to the difference in weight between a container supported by the main weighing machine and a predetermined weight greater than the container, and means for discharging the ballast from the auxiliary weighing machine upon the completion of the weighing of a load or charge by the main weighing machine.

13. The combination with the scale beam of a weighing machine, of a scale platform balanced on said beam, a rod rigid with said platform depending therefrom, and a ballast bucket on the lower end of said rod.

14. The combination with the scale beam of a weighing machine, of a scale platform seated on said beam so as to be capable of rocking about an axis parallel with the pivotal axis of the beam, a member rigid with said platform extending downwardly therefrom to a point below the scale beam, and a ballast-receiving device on the lower end of said member.

15. The combination with the scale beam of a weighing machine, of a scale platform supported on said beam so as to be capable of rocking about an axis parallel with the pivotal axis of the beam, a member rigidly connected with the bottom of the platform extending downwardly therefrom, and a ballast-receiving device on the lower end of said member.

16. The combination with the scale beam of a weighing machine, of a scale platform supported on said beam so as to be capable of rocking about an axis parallel with the pivotal axis of the beam, a member rigidly connected with said platform and extending downwardly from the same a considerable distance below the beam, a ballast bucket on the lower end of said member, and means controlled by said bucket for delivering ballast thereto.

17. The combination with the main scale beam of a weighing machine, of a ballast-receiving bucket, a stationary casing arranged beside said bucket and extending above and below the same, said casing having a spout adapted to discharge into said bucket and a hopper lying below the bucket and adapted to receive ballast from the latter, means within the casing for carrying ballast received from the hopper and delivering it to said spout, a controlling valve for said spout, and a ballast discharging device associated with said bucket.

18. The combination with a weighing machine, of a conveyor for delivering a container to and again carrying it away from the weighing machine, a driving shaft, a clutch between said driving shaft and said conveyer, a feed valve for controlling the delivery of material to the weighing machine, means controlled by said valve for throwing in said clutch, and means controlled by the conveyor mechanism for throwing out the clutch.

19. The combination with a weighing machine having a scale beam, of conveying mechanism for delivering a container to and then removing it from the weighing machine, a driving shaft, a clutch between the conveying mechanism and said shaft, means for locking the scale beam in the position which it assumes upon the completion of the weighing of the load, a valve for controlling the delivery of material to be weighed to the weighing machine, means controlled by said valve for throwing in the clutch, and means controlled by the weighing mechanism for throwing out the clutch and unlocking the scale beam.

20. The combination with a weighing machine having a scale beam, of a counterweight, means for permitting the scale beam to oscillate through a limited angle independently of the counterweight when the counterweighted end of the scale beam is below the poising position, ballast-weighing mechanism operatively associated with said scale beam for the purpose of adding varying amounts of ballast to the load-receiving end of the latter, the parts being so constructed and arranged that the ballast-weighing mechanism may assume a poising position before the lost motion between the scale beam and its counterweight is taken up.

21. The combination with a weighing machine having a scale beam, of a counterweight, means for permitting the scale beam to oscillate through a limited angle independently of the counterweight when the counterweighted end of the scale beam is below the poising position, ballast-weighing mechanism operatively associated with said scale beam for the purpose of adding varying amounts of ballast to the load-receiving end of the latter, the parts being so constructed and arranged that the ballast-weighing mechanism may assume a poising position before the lost motion between the scale beam and its counterweight is taken up, a valve for controlling the feed of material to the main weighing machine, and means set into action by the scale beam when the latter reaches a position in which the lost motion between it and its counterweight is taken up to open said valve.

22. The combination with a weighing machine, of a valve for controlling the feed of material to the weighing machine, a catch device for holding said valve in either a fully open position or in a partially open position, a rock shaft connected with said valve, counterweights associated with said rock shaft so as to tend to turn the shaft in the direction to close the valve, a feeding device for the material to be weighed, a high speed drive and a low speed drive for said feeding device, means controlled by said rock shaft for bringing the high speed drive into play when the valve is fully open and for bringing the low speed drive into play when the valve is only partially open, and means associated with the weighing machine for successively actuating said catch device so as to permit the valve to close partially after the greater portion of a charge has been delivered and to close completely at the completion of the weighing operation.

23. The combination with a weighing machine having a scale beam, of a valve for controlling the delivery of material to be weighed to the weighing machine, actuating mechanism for said valve, a rotating shaft having a cam thereon, a controlling lever for said mechanism adapted to be actuated by said cam and normally lying out of the path of the latter, and a member actuated by the scale beam for moving said lever into operative relation to the cam.

24. The combination with a weighing machine having a scale beam, of a valve for controlling the delivery of material thereto, actuating mechanism for said valve, a rotary shaft having a cam thereon, a controlling lever adapted to be actuated by the cam but normally out of operative relation thereto, a second lever, a swinging dog mounted on one end of said second lever so as to be capable of swinging into a position directly above one end of said controlling lever when the load-receiving end of the scale beam is in its highest position and to engage with said controlling lever and press it downwardly into operative relation to said cam when the load-receiving end of the scale beam descends to a predetermined point.

In testimony whereof, I sign this specification.

GEORGE HOEPNER.